(12) United States Patent
Ray et al.

(10) Patent No.: US 8,687,212 B2
(45) Date of Patent: Apr. 1, 2014

(54) METHOD FOR PROTECTING CONTENT OF A FAX CONFIRMATION SHEET

(75) Inventors: Elton T. Ray, Lakeville, NY (US);
Thomas Robson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 996 days.

(21) Appl. No.: 12/391,377

(22) Filed: Feb. 24, 2009

(65) Prior Publication Data

US 2010/0214590 A1 Aug. 26, 2010

(51) Int. Cl.
*G06K 15/00* (2006.01)
*G06F 3/12* (2006.01)

(52) U.S. Cl.
USPC ........................................................ 358/1.14

(58) Field of Classification Search
None
See application file for complete search history.

(56) References Cited

U.S. PATENT DOCUMENTS

| | | | | |
|---|---|---|---|---|
| 5,438,433 A * | 8/1995 | Reifman et al. | ............... | 358/468 |
| 5,796,410 A * | 8/1998 | Baird | ............................ | 345/471 |
| 6,188,766 B1 * | 2/2001 | Kocher | .......................... | 380/246 |
| 6,658,400 B2 * | 12/2003 | Perell et al. | ............................ | 1/1 |
| 7,054,039 B2 * | 5/2006 | Burke | ............................ | 358/405 |
| 7,079,181 B2 * | 7/2006 | Dow et al. | ................... | 348/231.1 |
| 7,830,541 B2 * | 11/2010 | Juliano | .......................... | 358/1.15 |
| 2002/0126323 A1 * | 9/2002 | Dow et al. | ....................... | 358/473 |
| 2003/0020959 A1 * | 1/2003 | Henry | ............................ | 358/402 |
| 2006/0232813 A1 * | 10/2006 | Henry et al. | .................. | 358/1.15 |
| 2008/0007789 A1 * | 1/2008 | La | .................................. | 358/400 |
| 2008/0117473 A1 * | 5/2008 | Juliano | .......................... | 358/405 |
| 2008/0316526 A1 * | 12/2008 | Matsuzaki et al. | ............ | 358/1.15 |
| 2009/0034701 A1 * | 2/2009 | Henry et al. | .............. | 379/100.01 |
| 2011/0212717 A1 * | 9/2011 | Rhoads et al. | ................. | 455/420 |

* cited by examiner

*Primary Examiner* — Vincent Rudolph
*Assistant Examiner* — Marcus T Riley
(74) *Attorney, Agent, or Firm* — Philip E. Blair; Fleit Gibbons Gutman Bongini & Bianco P.L.

(57) ABSTRACT

What is provided are a system, method, and computer program product for protecting information displayed on a fax confirmation page. Several embodiments are provided. In one embodiment, for example, a Gaussian kernel is used to blur the digitized image to be printed on the confirmation page. In one method, a large enough blur kernel is selected so that text of a certain size will be rendered illegible. A method is also provided wherein a copy of the first page of the faxed document used to provide the content to be displayed on the confirmation page of the faxed document is stored on a storage device. A character sequence which references the stored original content on the storage media is printed on the confirmation page. A new confirmation page can be reconstructed and printed if it is desirable to have the altered content made visibly legible. Various other embodiments are disclosed.

15 Claims, 19 Drawing Sheets

| 0.00000067 | 0.00002292 | 0.00019117 | 0.00038771 | 0.00019117 | 0.00002292 | 0.00000067 |
|---|---|---|---|---|---|---|
| 0.00002292 | 0.00078633 | 0.00655965 | 0.01330373 | 0.00655965 | 0.00078633 | 0.00002292 |
| 0.00019117 | 0.00655965 | 0.05472157 | 0.11098164 | 0.05472157 | 0.00655965 | 0.00019117 |
| 0.00038771 | 0.01330373 | 0.11098164 | 0.22508352 | 0.11098164 | 0.01330373 | 0.00038771 |
| 0.00019117 | 0.00655965 | 0.05472157 | 0.11098164 | 0.05472157 | 0.00655965 | 0.00019117 |
| 0.00002292 | 0.00078633 | 0.00655965 | 0.01330373 | 0.00655965 | 0.00078633 | 0.00002292 |
| 0.00000067 | 0.00002292 | 0.00019117 | 0.00038771 | 0.00019117 | 0.00002292 | 0.00000067 |

FIG. 2

FAX TRANSMISSION COMPLETED
SUCCESSFULLY
PAGES SENT: 1
PAGES RECEIVED: 1

608

SENT: 561-573-9455 (OK)
DATE: 01-28-2009
TIME: 8:34 AM (EST)

METHOD FOR PROTECTING CONTENT OF A FAX CONFIRMATION SHEET

TECHNICAL FIELD

The present invention is directed to systems and methods for protecting content displayed on a printed fax confirmation page.

BACKGROUND

Fax, (short for facsimile, from Latin "fac-simile", meaning to make similar), is a telecommunications technology used to send/receive copies of documents (facsimiles) using devices placed in communication over a network such as a telephone network or internet. The word telefax, (short for telefacsimile, meaning to make a copy at a distance), is a synonym. Although the term "fax" is not an acronym, it is often written as "FAX". A fax device may also be referred to as a telecopier. When sending documents to people at long distances or who are remotely located, fax transmission has a distinct advantage over postal mail or courier in that the delivery of the document is nearly instantaneous. In recent times, this technology has the disadvantage of being relegated to a position beneath email as a prevailing form of document transferral.

Fax machines enable the electronic transmission and reception of facsimiles (faxes) to a recipient. Although devices for transmitting printed documents electrically have existed in various forms since the mid-$20^{th}$ century, modern fax machines became relatively widely available in the mid-1970s as electronic sophistication increased with expanding infrastructure and costs of technologies decreased. Over time, faxing gradually became affordable, and by the mid-1980s, fax machines were widely used in commerce. Although the technology has faced increasing competition from Internet-based document transmission systems, fax devices still retain their advantages particularly in the transmission of sensitive material which, due to legislative mandates regarding privacy such as, for instance, the Health Insurance Portability and Accountability Act (HIPAA), cannot be transmitted over the Internet unencrypted. In many countries, electronic signatures on faxed documents such as contracts and other agreements are recognized as binding.

Fax machines typically consist of an image scanner, a communications interface (modem), and a graphic user interface (GUI) for the interaction of the user with the fax device. An image scanner is a device that optically scans a document and converts it to a digital image. Image scanners typically use a charge-coupled device (CCD) or a contact image sensor (CIS). CCD type scanners typically contain three rows (arrays) of sensors with red, green, and blue filters. CIS scanning consists of a moving set of red, green, and blue LEDs strobed for illumination and a connected monochromatic photodiode array for light collection. The scanning bed is usually composed of a glass pane (platen) under which there is a bright light which illuminates the pane and a moving optical array in CCD scanning. A document to be scanned is placed on the platen, an opaque cover is usually lowered over the document to exclude ambient light, and the sensors and light sources move across the pane beneath the platen. An image is visible to the detector because of the light being reflected by the face of the document. Transparent images require special accessories that illuminate them from the upper side.

In operation, a user places a page of a document to be electronically transmitted onto the surface of the platen, closes the lid, enters a telephone number of a fax device into a graphical user interface (GUI), and then hits a "SCAN" or "SEND" button. The document is scanned into a digital representation and stored in memory. The fax machine then dials the telephone number of the recipient fax machine and repeatedly attempts to establish a digital communication therebetween. Once the communication between the sending machine and the receiving machine has been established, the digitized image is transmitted. Upon completion of the electronic transmission, the sending machine will print a confirmation page which then sits in a tray until retrieved by the sender.

Typically, the printed confirmation page comprises a scaled-down image of all or a portion of a first page of the faxed document. It is not uncommon for people to forget to retrieve the confirmation page as it may take many attempts by the fax machine to establish a communication with the recipient fax machine because, for example, the telephone line is busy or there are other fax jobs already queued up in the sending fax machine which precede your fax job, and the sender doesn't want to wait for the transmission to complete and the confirmation page to be printed afterward. Often, users scan the document they wish to fax, hit the SEND button, remove the document from the fax machine and walk away. At a later time, their fax job has completed and the confirmation page printed. The first page or a portion of the first page of their fax job is reprinted on the confirmation sheet. If the first page of their fax job contains personal information or other sensitive confidential subject matter such as, for example, their social security number, home address and phone, credit card information, or the like, then this information may end up on the printed confirmation page which remains in the output tray of the printer until it is retrieved by the sender. During this time, the sender's information is exposed to others who might make use of the same fax machine. Others may read the personal information printed on the confirmation page. Although some fax machines enable a sender to turn off the printing of a confirmation sheet, often a copy of the confirmation is required by the sender as a visual confirmation that their document was sent and received. The sender may require the printed confirmation page for their records.

Accordingly, what is needed in this art are methods for protecting information displayed on a fax confirmation page while still providing the sender with a visual confirmation that their document had been sent and received.

BRIEF SUMMARY

What is provided are a novel system, method, and computer program product for protecting information displayed on a fax confirmation page. Several embodiments are provided. In one embodiment, for example, a Gaussian kernel is used to blur the digitized image to be printed on the confirmation page. Other embodiments are also provided. A method is also provided herein to reconstruct the confirmation page if it is desired by a user to do so.

One example embodiment of the present method for protecting content printed on a fax confirmation page involves the following. A digital image of a page of a document to be transmitted via facsimile transmission is received by an image scanning device which scans the document into digital form. A number (or address) of a destination fax device is provided and the digital image of the fax job is transmitted. Upon receipt of the transmitted fax job, the receiving device acknowledges the fax transmission. Thereafter, the sending device identifies content contained on a page of the fax job which is to be displayed on a fax confirmation page. The identified content is then modified such that the content is no longer legible. In one embodiment, a Gaussian blur function is used which alters at least a portion of the content of the digital image by shifting pixels thereof. A template of a fax confirmation page is obtained and various fields of the template page are provided with information about the fax job such as, for example, the number of pages transmitted and received, the time/date the fax job was sent, and whether the facsimile transmission was indeed successful. The modified content is combined with the template fax confirmation page. The confirmation page is then provided to an output device wherein the confirmation page is printed. In such a manner, the content displayed on the output confirmation page for the fax job is no longer visibly legible.

In another embodiment, text characters contained in the identified content are detected using, for example, optical character software tools. The detected text content is then altered by modifying the characters thereof. In one example, portions of the detected text are modified by replacing text with characters and symbols chosen at random. In another, all or portions of the words of the detected text are redacted (removed entirely) or are blackened-out such that the text is no longer readable. By modifying portions of the content displayed on the printed confirmation page, a spatial relationship is preserved between text of the page of the fax job from which the content was identified.

In yet another embodiment, a copy of the content is stored to a memory or a storage device before the content is modified. A location of the stored content and other information to retrieve the stored content is hashed or otherwise converted to a coded sequence of characters which enables the corresponding stored copy of the original content to be indexed, located, and retrieved from the storage device. Thereafter, the confirmation page containing the modified content is printed along with the character sequence. If, at a later date, the sender desires to reconstruct the confirmation page, the printed confirmation containing the character sequence is scanned using a document scanning device. The character sequence is retrieved from the scanned printed confirmation page. The obtained character sequence is used to reference the stored content from its location on the storage medium. The un-modified content retrieved from storage is combined with the confirmation page template to produce a new confirmation page which, in turn, is provided to an output device where it is printed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 2 shows a sample matrix produced by sampling the Gaussian filter kernel (σ=0.84089642) at the midpoints of each pixel and then normalizing;

DETAILED DESCRIPTION

Figure 1A:
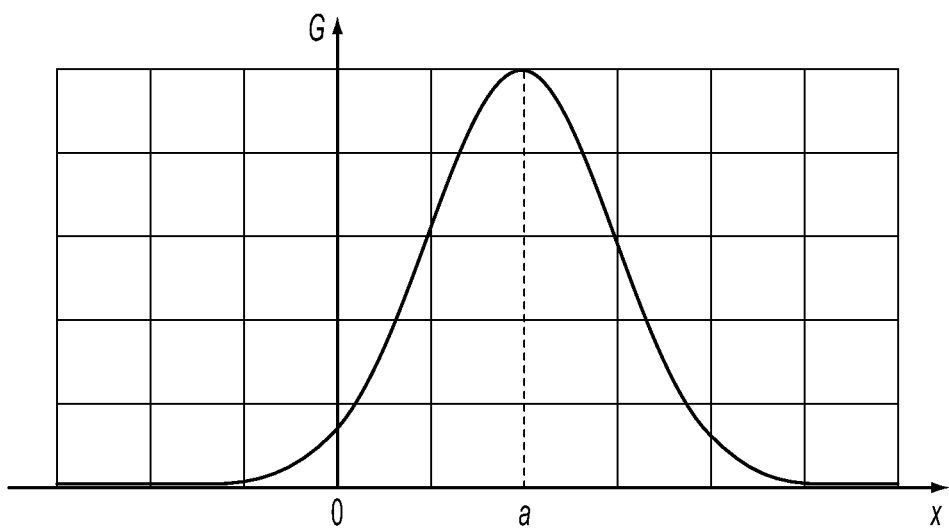
FIG. 1A shows a plot of a one dimension Gaussian function (normal distribution)

What is provided are a system, method, and computer program product for protecting information displayed on a fax confirmation page. Also provided is a method for reconstructing the confirmation page in those instances where it is desirable to have a printed copy of the confirmation page with the visibly legible content displayed thereon. Embodiments are provided which preserve a spatial relationship between the original content of the fax document and the altered content on the printed confirmation page. Various features and enhancements have also been provided.

It should be understood that one of ordinary skill in this art would be readily familiar with image scanners, fax machines, performing a fax operation, digital documents, and other facets related to facsimile transmission. Additionally, one of ordinary skill would be familiar with mathematical techniques and functions which perform a blurring operation on a digital image, or portions thereof, by rearranging pixels of the image such that the content displayed thereon is rendered no longer visibly legible. One of ordinary skill in this art would also be knowledgeable about computers and methods used to store, index, and retrieve data stored on a storage medium and with hardware and software programming systems and methods sufficient to implement the functionality and capabilities described herein in their own hardware environments without undue experimentation.

DEFINITIONS

A "multifunction device" (or MFD), as used herein, broadly refers to devices known in the digital document reproduction arts which includes printers, copiers and other xerographic devices, newspaper production machines, book publishing systems, photographic printing and image reproduction equipment, image scanners and facsimile machines, to name a few. Such devices generally provide a user interface (UI) such as touchscreen and a display such as a CRT or LCD for effectuating a human interaction with the multifunction device through user-selectable menu options displayed thereon. Many MFDs provide additional means for receiving a user input such as, for example, a keyboard, keypad, touchpad, mouse, and the like. Although a multifunction device is used herein to generally refer to document reproduction devices, it should be understood that the term is intended to encompass a wide variety of devices which can be placed in digital communication over a network with one or more computer platforms and/or with other multifunction devices for the receiving and/or transmitting of a digitized image and the manipulation of the received digital image in a manner in accordance with the teachings hereof. It should also be understood that one or more functions, features, functions, or capabilities performed by a computer system or special purpose processor such as an ASIC capable of performing one or more aspects of the present method may be integrated, in whole or in part, with any system or sub-system or device controller of a multifunction device. The terms "document production" and "document reproduction" are used interchangeably and are intended to mean devices capable of scanning and printing a document.

An "output device", as used herein, refers to a multifunction device capable of reducing a signal of a received image of a document to viewable form. The set of such devices is intended to further include monitors, video displays, LCDs, and the like. Providing the image of a document to such an output device is intended to mean communicating the image to the output device by transmitting the image in the form of signals over a network connection, interface, or other communication pathway, for rendering to viewable form. The step of providing the image to an output device is also intended to include storing the signals of the digital document image to a memory or storage media for subsequent retrieval. A color marking device, such as an inkjet printer, is one example of an output device capable of rendering received signal of the digitized document image onto a substrate by the visual integration of colored inks deposited thereon.

Introduction to Gaussians:

Gaussians are widely used in statistics where they appear as the density function of the normal distribution. They are also widely used in signal processing where they serve to define Gaussian filters. They are also used in image processing where two-dimensional Gaussian functions are used to blur images. Gaussian functions arise by applying the exponential function to a general quadratic function. Gaussians are those functions whose logarithm is a quadratic function. A Gaussian is a function having the general form:

$$f(x) = ae^{-\frac{(x-b)^2}{2c^2}},$$

where a is the height of the bell curve's peak, b is the position of the center of the peak, c controls the width of the bell, and e≈2.718281828 (Euler's number). The graph of a Gaussian is a characteristic symmetric bell-shaped curve that tapers off towards +/− infinity.

A Gaussian blur function, as used herein, describes a mathematical technique for blurring an image using a Gaussian function such that the image appears out of focus to the human eye. The Gaussian blurs the image by calculating the transformation to apply to each pixel in the image. The visual effect of this blurring is a smoothed filtering of the image which resembles viewing the image through a translucent material. Mathematically, applying a Gaussian blurring technique to an image is the same as convolving the image with a Gaussian function. Since the Fourier transform of a Gaussian is another Gaussian, applying a Gaussian blur has the effect of reducing the image's high-frequency components. In essence, the Gaussian blur acts as a low pass filter. The equation of a Gaussian function in one dimension is given by:

$$G(x) = \frac{1}{\sigma\sqrt{2\pi}} e^{-\frac{x^2}{2\sigma^2}}. \tag{1}$$

A plot of the above-described 1D Gaussian is shown in FIG. 1A. The parameter $\sigma$ is the standard deviation, and its square $\sigma^2$ is the variance.

Figure 1B:
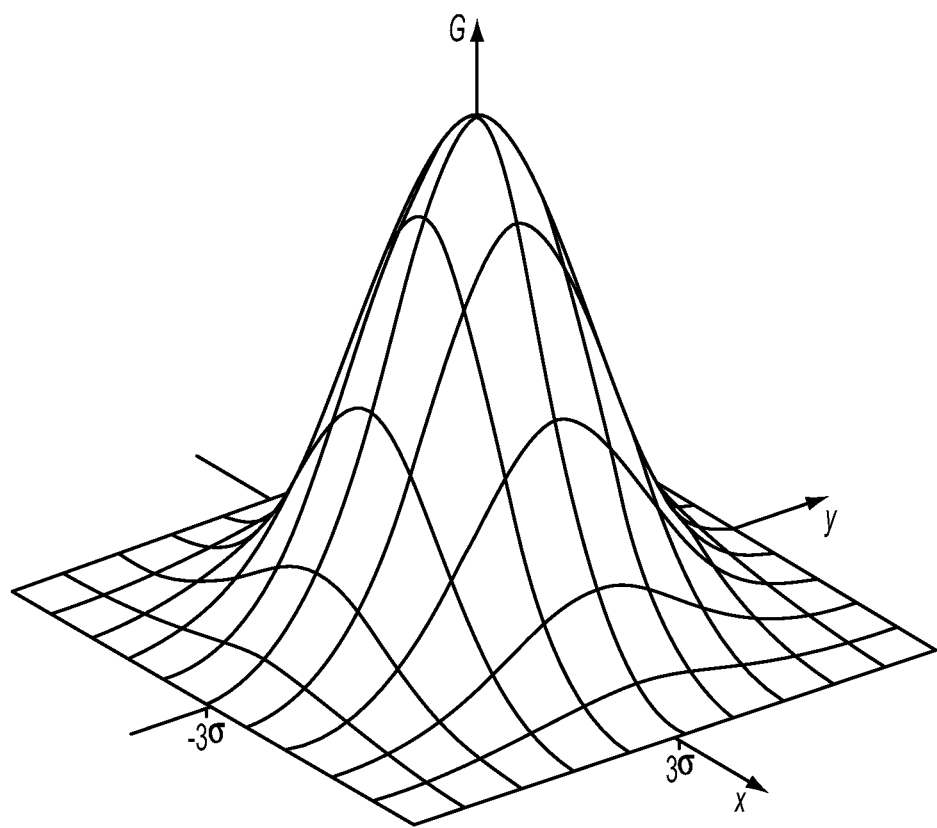
FIG. 1B shows a plot of a two dimension Gaussian function truncated at ±3σ.

In two dimensions, this becomes the product of two Gaussians, one per direction:

$$G(x, y) = \frac{1}{2\pi\sigma^2} e^{-\frac{x^2+y^2}{2\sigma^2}}, \tag{2}$$

where x is the distance from the origin in the horizontal axis, y is the distance from the origin in the vertical axis, and a is the standard deviation of the Gaussian distribution. The blur radius r is given by: $(r^2=x^2+y^2)$. As a guideline, the blur radius should be approximately $3\sigma$. When applied in two dimensions, this formula produces a surface whose contours are concentric circles with a Gaussian distribution from the center point. A plot of the above-described Gaussian distribution in 2D truncated at $\pm 3\sigma$ is shown in FIG. 1B.

The two dimensional Gaussian function can be rewritten as:

$$G(x, y) = \frac{1}{2\pi\sigma^2} e^{-\frac{x^2+y^2}{2\sigma^2}} \quad (3)$$
$$= \frac{1}{\sigma\sqrt{2\pi}} e^{-\frac{x^2}{2\sigma^2}} \frac{1}{\sigma\sqrt{2\pi}} e^{-\frac{y^2}{2\sigma^2}}$$
$$= G(x)G(y).$$

This means the 2D distribution can be split into a pair of 1D distributions. In practice, this means that to apply the 2D Gaussian filter to an image it is sufficient to filter the image in a horizontal direction with a 1D filter and then filter the result with the same filter in a vertical direction. Which direction is applied first makes no difference as the operation is commutative. Thus, 2D Gaussian filtering with a [2N+1]×[2N+1] window size can be reduced to a pair of 1D filters with [2N+1] window sizes. This means significant computational efficiency can be achieved for large images. Values produced by this distribution are used to build a convolution matrix. A sample matrix, produced by sampling the Gaussian filter kernel ($\sigma$=0.84089642) at the midpoints of each pixel and then normalizing, is shown in FIG. 2. Note that the center element (at [4,4]) has the largest value, decreasing symmetrically as distance from the center increases. Note too that 0.22508352 (the central number) is 1177 times larger than 0.00019117 which is just outside 3$\sigma$.

Introduction:

As discussed in the background section hereof, when one sends a fax on certain multifunction devices, a confirmation page is printed which typically includes a scaled-down image of the content contained on the first page of the original document which was faxed. Possession of the confirmation page provides a degree of confidence to the sender that they indeed faxed the correct document and in the correct orientation, page order, and the like, to the right sender and that the document was received by the recipient fax machine. Quite often people forget to retrieve their confirmation sheets from the print tray of the device which rendered the confirmation page or they subsequently retrieve their printed confirmation page(s) at a later time/date. While their confirmation page is not in their possession, personal and/or otherwise sensitive information displayed on the printed confirmation page is visible to anyone who happens to see the printed page, even by mistake. What is provided herein is a method for obscuring or partially obscuring portions of the content of the digital image which gets included on the printed confirmation sheet. By an implementation hereof, such information printed on the confirmation sheet is made no longer legible while still retaining enough visual context to provide the sender with some confidence that their document was indeed faxed correctly. Moreover, the image on the fax confirmation sheet gives confidence that the document has been registered correctly by the scanner. Without it, a user might not find out that they faxed a one-sided document backwards, or sent multiple blank pages. But to correctly interpret that their document has faxed correctly, you need to be able to recognize the image on the confirmation page. So you need to balance obscuring sensitive data while retaining enough visual information to be able to recognize the image.

Figure 3:
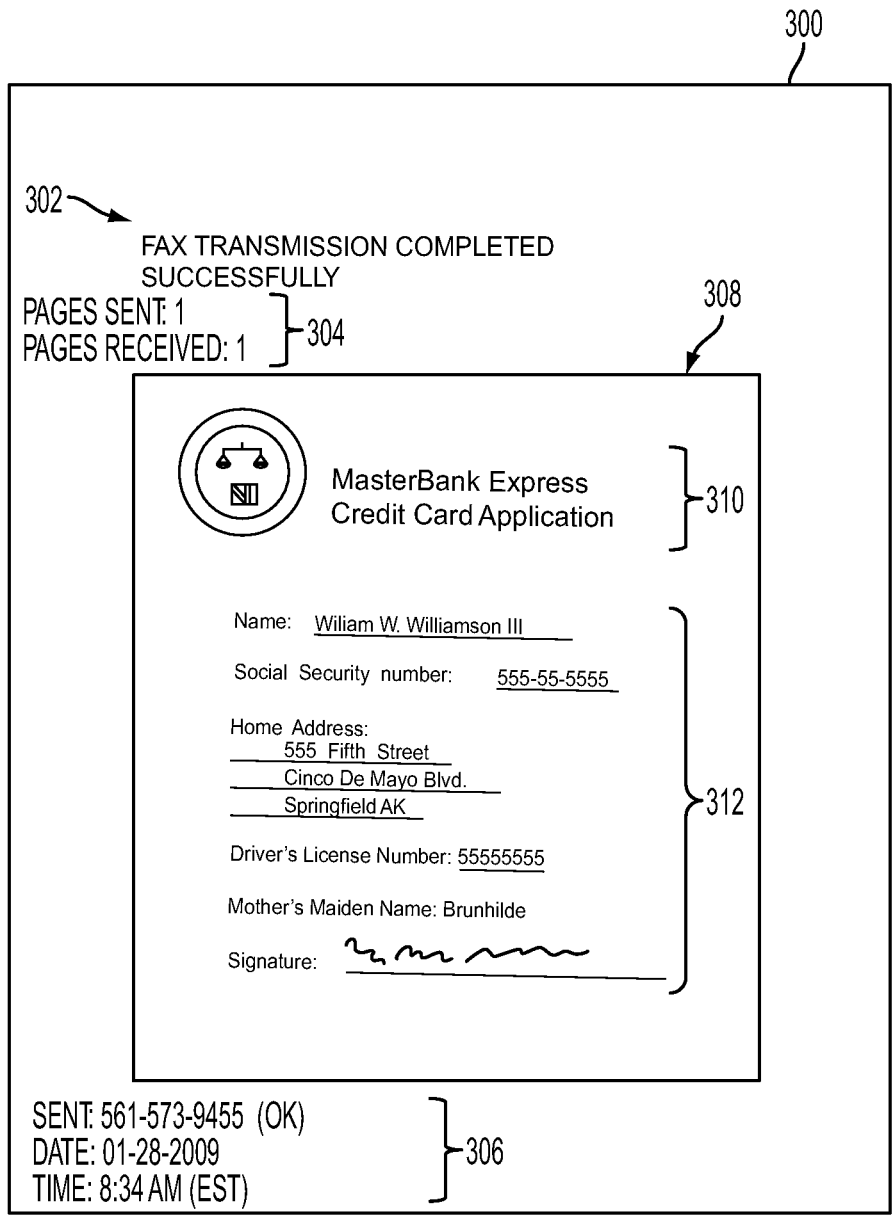
FIG. 3 illustrates one example confirmation sheet of a fax job which was sent and received successfully.

Reference is now being made to FIG. 3 which illustrates an example confirmation page 300 of a fax job which was sent and received successfully. The example confirmation sheet of FIG. 3 contains a header section 302 which, as shown, boldly indicates that the facsimile transmission completed successfully. At area 304, the number of pages scanned and the number of pages sent is displayed. As shown, the present fax job comprised a single page (1 page sent) and a single page was successfully received. Also at area 306 is shown the telephone number of the recipient fax machine to which the fax document was sent, along with the date and time of transmission. The confirmation sheet also contains a digital image 308 representation of the first page of the scanned documents of the fax job. Contained thereon is a header 310 of the sender's application for a credit card with a fictitious financial entity "MasterBank Express". The sender's credit application contains several items of personal information 312. In the example confirmation sheet of FIG. 3, the personal information has their name, social security number, home address, driver's license number, mother's maiden name, and a digital copy of their signature. Such personal information printed on a fax confirmation sheet left sitting in an output tray of a print device may put the sender at an increased risk for identity theft, which has been an increasing problem. In order to avoid such exposure, the premise hereof is to obscure some or all of the information obtained from the first page of the fax job before such content gets displayed on the printed fax confirmation sheet, while still retaining the intended usefulness of that confirmation page itself, among these are the telephone number of the destination fax machine, the time/date stamp, and whether the fax was transmitted successfully.

Example Networked Environment

Figure 4:
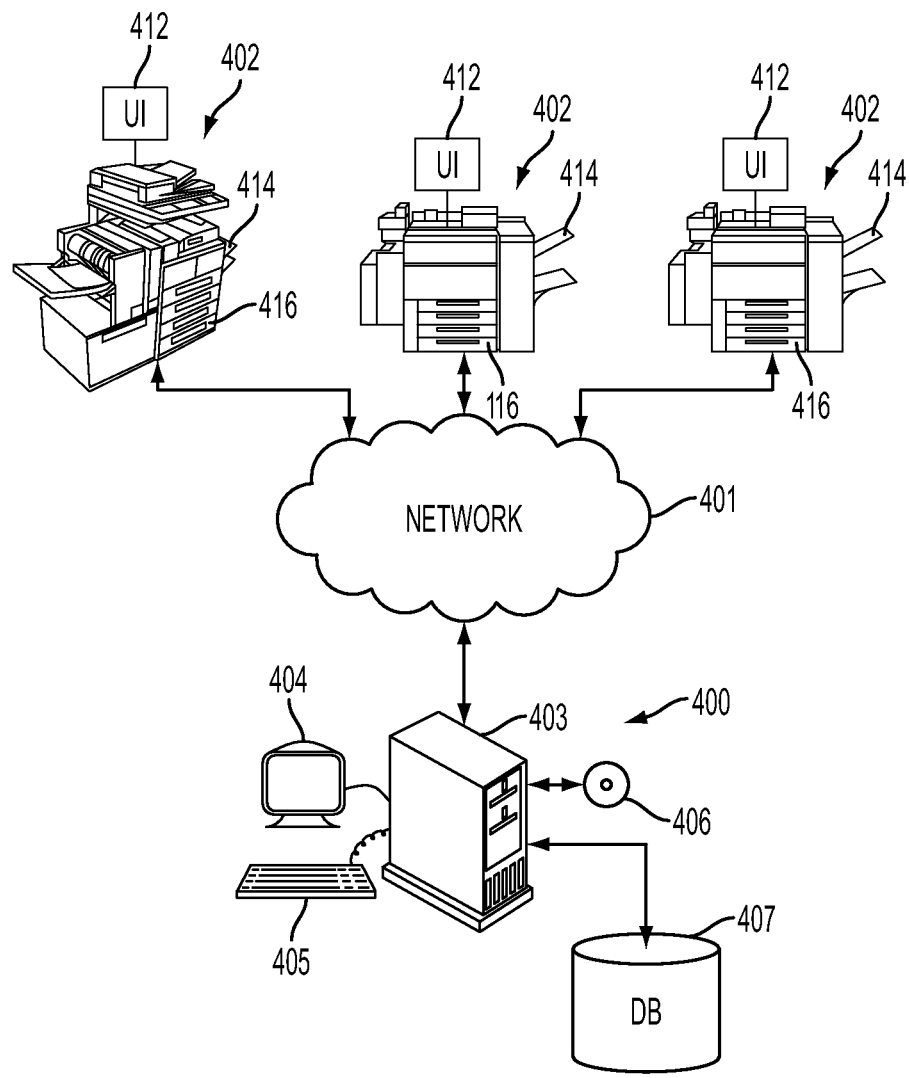
FIG. 4 illustrates one embodiment of a networked computing environment wherein one or more aspects of the present method for protecting information printed on a fax confirmation page is likely to find its intended uses.

Reference is now being made to FIG. 4 which illustrates one embodiment of a networked computing environment wherein one or more aspects of the present method are likely to find their intended uses.

In FIG. 4, the example networked document reproduction environment is shown generally comprising a computer system 400 connected to various multifunction devices 402 over network 401. Such a networked environment may be wholly incorporated within the confines of a single print/copy center or may be distributed to many different locations throughout an enterprise network.

As is shown generally, computer platform 400 is placed in digital communication with a plurality of multi-function devices 402 over a network illustrated as amorphous cloud 401. Many aspects of network 401 are commonly known and may include the World Wide Web. A further discussion as to the construction and/or operation of a specific network configuration or the Internet has been omitted. Suffice it to say, data is transmitted in packets between networked devices via a plurality of communication devices and links using established protocols. Data is transferred in the form of signals which may be, for example, electronic, electromagnetic, optical, light, or other signals. These signals are provided to a communications device such as a server which transmits and receives data packets by means of a wire, cable, fiber optic, phone line, cellular link, RF, satellite, or other medium or communications pathway.

The computer platform is shown comprising a computer case 403 housing therein a motherboard, CPU, memory, interface, storage device, and a communications link such as a network card. The computer system also includes a display 404 such as a CRT or LCD. An alphanumeric keyboard 405 and a mouse (not shown) provide a mechanism for the computer system to accept a user input. Also shown is computer program product 406 containing machine executable instructions and other program instructions for implementing the functionality and features of the present method. Such a computer platform includes database 407 for storage and retrieval of data. The computer platform is capable of running a server software program (or housing server hardware) for hosting installed applications. Server software capable of hosting service applications are readily available from a variety of vendors. The computer platform may be further capable of creating and running service proxies for directing requests for applications from a client device to the platform hosting the requested application and for redirecting responses from a host device to a requesting client device. The computer platform 400 may act as a server to the processors (not shown) resident aboard a controller module residing within one or more of the multifunction devices 402. The computer platform may alternatively be any of a desktop, laptop, server, mainframe, or the like, common in the arts. Computer platform 400 is capable of receiving an image of a document which has been scanned into digital form by one of the multifunction devices 402. Special purpose program instructions loaded thereon cause a central processor of the computer to make determinations, discussed with respect to the flow diagrams hereof, and provide the generated confirmation page to be printed on one of the print devices 402. The computer platform includes at least one processor capable of executing machine readable program instructions for performing one or more aspects of the present method.

In the embodiment shown, computer system 400 implements database 407 wherein various records are stored, manipulated, and retrieved in response to a query. Although the database is shown as a external device, the database will likely be internal to computer case 403 mounted on the hard disk contained therein. Records stored in the database can be retrieved, modified, and updated computer platform 400 or, additionally, by any of the multifunction device 402 connected to network 401 or which have been otherwise placed in communication with the database. A record is any data structure capable of containing information which can be indexed, stored, searched, and retrieved by a database engine in response to a query. A record can be configured though a software construct to contain one or more fields of information. Such constructs are well established in the software and database arts. The database is one known in the arts capable of indexing a plurality of records, receiving and interpreting a query, and retrieving one or more of the appropriate records in response to the query. The database is also capable of adding new records and updating existing records. Since database construction, optimization, indexing, and record retrieval techniques are well known, a further discussion as to a specific database implementation is omitted. Suffice it to say that one of ordinary skill would be able to readily acquire and implement a database to store, index, and retrieve records in response to a query.

Multifunction devices 402 are shown including a user interface (UI) 412 for the display thereon of icons and other user-selectable menu options and displayed information. The graphical UI includes a touchscreen display for receiving user input via a touch-sensitive surface, and may further include any of a keyboard, keypad, mouse, and the like. A display on the multifunction device is one of many possible displays retained in a memory associated with a user interface, including device-specific program instructions for instructing the processor control unit to configure the device to perform one or more aspects of the present method and/or to electronically scan and transmit a fax job to a destination device placed in communication therewith. The user interface includes controls for programming a range of values therefrom for carrying out various embodiments of the present method. The user interface includes controls for programming the specific system settings to configure any of the networked multifunction devices to perform the present method in accordance with the teachings hereof. In the embodiment shown, the multi-function devices 402 include a tray 414 for document input, and paper trays 416 for retaining a variety of print media. Such devices are capable of performing a print/scan/copy job function as is generally known in the document reproduction arts. It should be appreciated that some of the MFDs that typically make up a P2P network are headless boxes. Headless boxes don't have a monitor, keyboard, or mouse associated therewith. One or more of the multifunction devices 402 further incorporates various features, capabilities, and functionality of scanner device for scanning a document into a digital image, in a manner which is well known in the arts. One or more of the multifunction devices 402 further incorporates a fax capability for transmitting a digital image of a scanned document (fax job) over the network to a second device capable of receiving the transmitted facsimile and for printing the same.

The computer platform 401 and the plurality of multifunction devices 402 collectively form a subnet. Techniques for placing computers in network communication with digital devices are well established. Therefore, a further discussion as techniques for placing such systems and devices in network communication has been omitted. The computer platform 400 and the multifunction devices 402 each includes a network interface card (not shown) which facilitates the transmission of data over network 401. Any of the networked devices may include an Ethernet or similar card to connect to network 101 using, for example, a modem. Typical network interface cards found in the arts also enable one or more of the functionality of, for example, general purpose systems such as POTS (Plain Old Telephone System) and Integrated Services Digital Network (ISDN) and/or special purpose systems such as a Local Area Network (LAN) and Wireless Area Network (WAN) functionality. One or more of the multifunction devices of the document reproduction environment of FIG. 3 may also be place in digital communication with one or more of the other devices in the network depending on the desired configuration and the objectives of the end-user hereof. The various print/copy/scan devices of the document reproduction environment may also include processors capable of executing program instructions incorporating one or more aspects and/or feature enhancements of the present method. One or more of the multifunction devices 402 can be placed in digital communication with the database of 407 over network 401.

Example Flow Diagram

Figure 5:
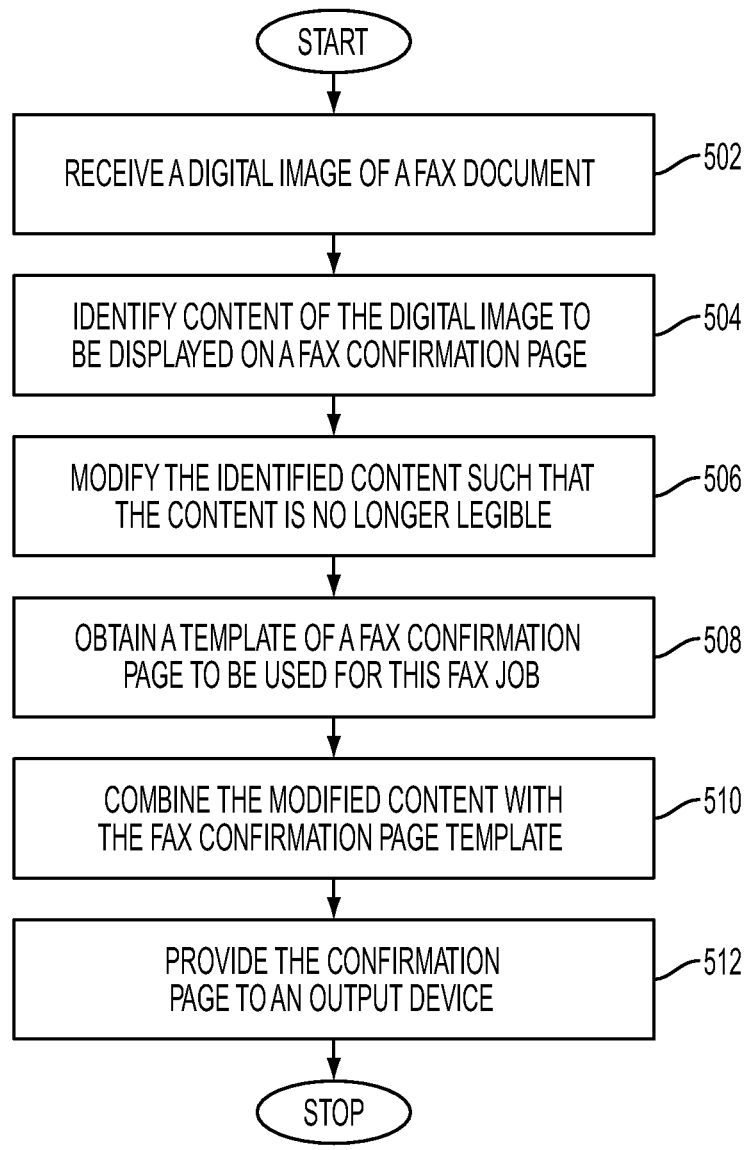
FIG. 5 is a flow diagram of one example embodiment of the present method for protecting information displayed on a printed fax confirmation sheet.

Reference is now being made to the flow diagram of FIG. 5 which illustrates one example embodiment of the present method for protecting information displayed on a printed fax confirmation sheet.

Typically, a page of a document to be faxed is scanned by the image scanning portion of a facsimile machine. Scanning of the document page produces a digital image of the document. A number of a destination facsimile device is provided by a user through a GUI or is received via a network connection. Alternatively, the number of the destination facsimile device has already been entered and is stored locally and made user-selectable through a menu option displayed on the GUI of the facsimile machine or a computer platform performing a fax function. A communication pathway is established by the transmitting device and a destination device which is intended to receive the transmitted fax document. The scanned digital image of the fax document is then transmitted using established protocols electronically negotiated between the sending device and the receiving device. Upon successful transmission of the faxed document, an acknowledgement signal is provided back to the sending device that the document(s) have been received and no errors have occurred or have been detected. Receipt of the acknowledgement signal by the sending device initiates the production of a confirmation page for the sender to keep as part of their record that the document had been successfully sent to the destination device at the displayed time/date. One embodiment of a printed confirmation page is shown in FIG. 3 and includes the telephone number of the destination device to which the fax job was transmitted, a time/date stamp, and the number of pages transmitted, along with an indication that the fax job was successful. The format of the confirmation page may vary depending on the various confirmation page formats available in a memory or a storage device of the sending fax machine.

At 502, a digital image of a page of a fax document is received. The document (fax job) is one which is to be transmitted via facsimile transmission. The digital image can be received, for example, by an image scanning device which scans the document into digital form. One such device is shown as MFD 402 of FIG. 4. The source digital image can be received in a plurality of ways. The source image may be captured by a digital camera and transferred to the fax machine via a USB connection. A image of a document to be faxed may be captured via a commercial printer. The document may comprise a source photograph to be faxed which is captured via a camera or other photographic device and the image data transferred via a cable over a network to the fax device. The source image to be faxed may be a light-sensitive material of a color or monochrome negative film read by a transparency input device. Source image data can be read from a memory device such as a floppy disk or a compact disk. The received digital image generally comprises a plurality of pixels each having one or more color data values.

At 504, content in a page of the digital image is identified which is to be displayed on a confirmation page. In one embodiment, the content is selected from a first page of the documents comprising the fax job. In another embodiment, only a portion of a page of the fax job is selected. It is much simpler, from a programming standpoint, to select all of the first page of the document(s) comprising the scanned digital image. Alternatively, portions of several pages are selected.

At 506, the identified content of the fax job is modified such that the content is no longer legible. In one embodiment, the content is provided to a blur function, such as a Gaussian kernel, which alters at least a portion of the content of the scanned image which is to be printed on the confirmation page by shifting pixels thereof. As discussed with respect to Equations 1-3, and as is discussed herein further, a Gaussian function is used to blur the content which is to be combined with the confirmation sheet to visually obscure the personal information printed thereon.

Figure 6:
FIG. 6 illustrates the example confirmation page of FIG. 3 wherein sensitive content displayed thereon has been obscured using a Gaussian blur function.

At 508, a template of a fax confirmation page is obtained which is intended to be used for the present fax job. In one example embodiment, the confirmation page template is obtained by the sending fax machine from a storage device or a memory. The confirmation page template is either selectable by the user or selected by default by the sending fax device. Alternatively, templates are provided by a user via a computer program product such as a CDROM or DVD or a removable storage medium or are accessed by the sending fax machine from a remote device such as the computer platform 400 of FIG. 4 over network 401. The confirmation page can have a variety of forms and formats and the example confirmation pages of FIGS. 3 and 6 are merely illustrative. Many other templates and formats for other confirmation pages exist.

At 510, the modified content is then combined with the fax confirmation template sheet to generate a confirmation page for the fax job. In one embodiment, combining the blurred content with the template of the confirmation page involves printing the blurred content in a designated area within the confines of the confirmation page template. Additional information may also be included on the confirmation page or may already be incorporated in the confirmation template.

At 512, the generated confirmation page is then provided to an output device. One such output device is a multifunction device 402 of FIG. 4 having a print capability. Alternatively, the confirmation is emailed to an email account of the sender over a network or is stored locally or is sent over a network to a remote platform for printing.

Attention is respectfully directed to FIG. 6 which serves to illustrate the example confirmation page of FIG. 3 wherein sensitive content displayed thereon (shown at 608) has been obscured using a Gaussian blur function.

An Embodiment for Performing a Gaussian Blur

The Gaussian blur function discussed with respect to the flow diagram of FIG. 5 will now be discussed in further detail.

A Gaussian blur effect is generated by convolving an image with a kernel of Gaussian values. A Kernel is a grid through which you filter the color values. The inner-most pixel is called the destination pixel and it receives colors from the surrounding source pixels. In practice, each pixel's new value is set to a weighted average of that pixel's neighborhood. The original pixel's value receives the heaviest weight (having the highest Gaussian value) and neighboring pixels receive smaller weights as their distance to the original pixel increases. This results in a blur that preserves boundaries and edges. In theory, the Gaussian function at every point on the image will be non-zero, meaning that the entire image would need to be included in the calculations for each pixel.

In practice, when computing a discrete approximation of the Gaussian function, pixels at a distance of more than 3σ are small enough to be considered effectively zero. Thus contributions from pixels outside that range can be ignored. Typically, an image processing program need only calculate a matrix with dimensions $\lceil 6\sigma \rceil \times \lceil 6\sigma \rceil$ (where Π is the ceiling function) to ensure a result sufficiently close to that obtained by the entire Gaussian distribution. Applying multiple successive Gaussian blurs to an image has the same effect as applying a single, larger Gaussian blur to the image whose radius is the square-root of the sum of the squares of the blur radii that were applied. For example, applying successive Gaussian blurs with radii of 6 and 8 gives the same results as applying a single Gaussian blur of radius 10, since $\sqrt{6^2+8^2}=10$. Because of this relationship, processing time cannot be saved by simulating a Gaussian blur with successive, smaller blurs—the time required will be at least as great as performing the single large blur.

The following 7 steps can be generally followed to perform a Gaussian blur.

Create a grid—The grid is the window through which you filter the color values of the image.

Weight The Kernel—This is done deciding how much color the destination pixel can borrow from its surrounding source pixels.

Separate Blur Axes—One way to cut the render time of the Gaussian blur is to use 'Separable Passes'. Rather than apply the entire kernel over every single pixel of the image, you first blur the pixels on the X axis and store the results in an X-buffer and then blur the pixels on the Y axis storing them in a Y-buffer.

Process The Kernel—In a 5 pixel wide kernel with a Gaussian weight of [1, 5, 10, 5, 1], when the kernel calculates a new color value for a middle/destination pixel, it borrows color from surrounding pixels using the following algorithm:

destinationColor=destinationColor+ (sourceColor*sourceWeight)/gaussianSum.

These variable names should be self-explanatory; especially in light of the appended source code. This equation is calculated for each channel whether it be RGB, HSB, CMYK, or RGBA. A fast Gaussian blur algorithm can be constructed if you only need to blur the luminance channel. The Gaussian-Sum variable is the sum of the numbers in your kernel. Or in this case, its the sum of a separable axis 22 (1+5+10+5+1).

5) Handle Edge Cases—An edge-case handler is code which deals with how the kernel effects the edges of the image. If the kernel is moved so that the destination pixel is at (0,0) on a corner of the grid then approximately ¾ths of the kernel is effectively off the image. Depending on how you store image data, this might return a black color value, a NULL, or even throw an out-of-bounds error. One solution is to create extra pixels of each image approximately half the kernel size and spread these edge pixels into this buffer zone so that the blur did not look boxy when the kernel was large One simple approach is to check whether the current source-pixel is out-of-bounds. If it is, the source color is taken directly from the value of the edge color without any extra array space or additional weighting algorithm being used to balance the values. This can create some boxy artifacts around the edges of the image in some situations but the trade-off between speed and quality may be acceptable to most users. Another way to handle edge cases is to use polar co-ordinates to loop (or wrap) the blur to the adjacent edge. A harsh limit can be applied to the edge making your blur stop or drop-off as it approaches the edge.

6) Iterate Kernel Across Image—This can be achieved by sliding the kernel across the image data array, building a blurred X-pass. Then, slide the kernel down the array taking values from the blurred X-pass and not from the original image data.

7) Update Pixels—Finally, write the Y-pass out to the original image array and update the pixels to the canvas.

When performing a blurring function, a small radius limits any effect of the blur to a circle of that size. As such, using a very small radius such as '1' effectively turns off blurring. Also, if a small radius is used with a large sigma, a slight squaring may result caused by the small radius cutting off the area blurred in a detrimental way. Also, small values for the sigma are typically only used to fuzz lines and smooth edges on images for which no anti-aliasing was used. In that situation a blur of $1^{0.3}$ is a useful value to remove most of the jagged edges. Large values however are useful for producing fuzzy images, for backgrounds or shadow effects or even image highlighting effects.

Various software tools for performing a Gaussian blur are available for free on the Internet. One software tool which is freely available on the Internet is ImageMagick® which is a software suite freely available under a GPL to create, edit, manipulate, and compose bitmap images. ImageMagick is a Registered Trademark of ImageMagick Studio LLC. ImageMagick is delivered as a binary distribution or as source code which runs on a variety of operating systems and includes a number of command-line utilities for performing a variety of operations on an image using an Application Programming Interface (API). Other blurring functions and methods are intended to fall within the scope of the appended claims. Example source code to perform a Gaussian blur on a digital image is freely available for download from the Internet. See: [http://www.librow.com/articles/article-9]. A copy of this program code is provided as an appendix to this document.

Alternative Embodiment for Modifying Text Content

Figure 7:
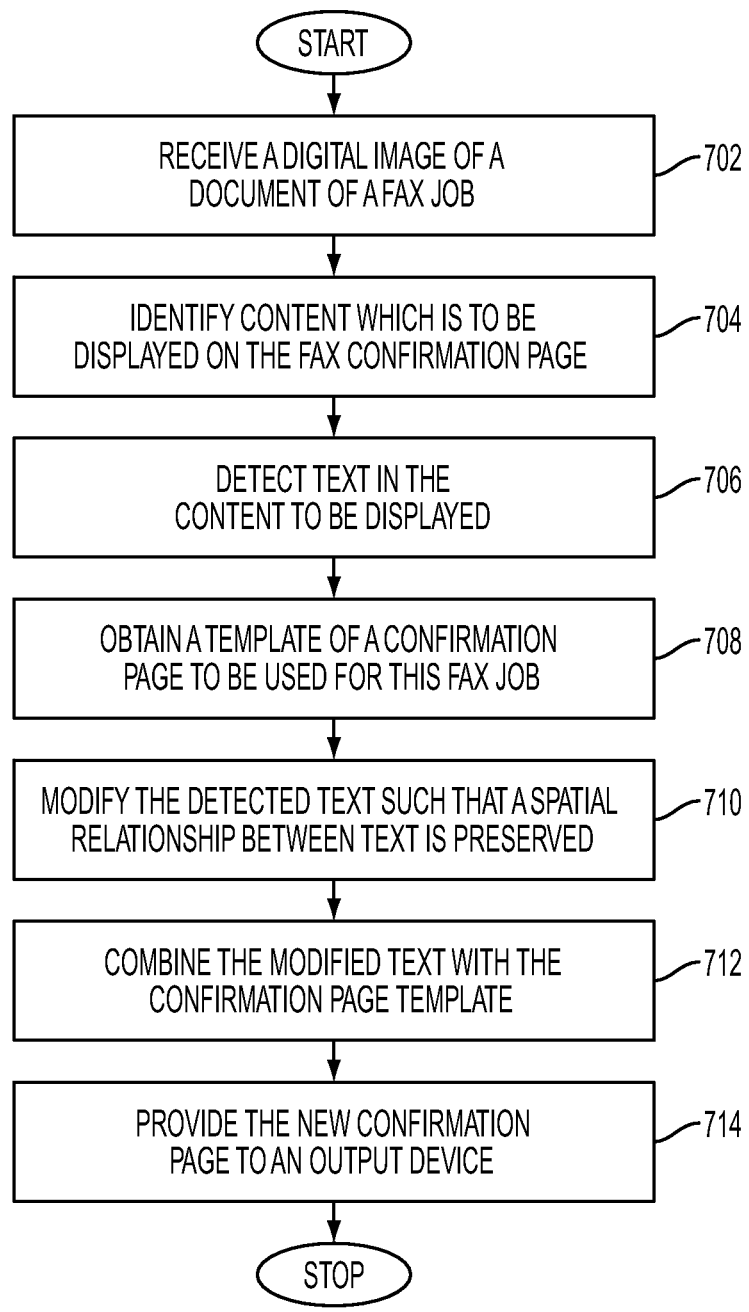
FIG. 7 is a flow diagram of one example embodiment of the present method for protecting content displayed on a fax confirmation page wherein portions of detected text are modified.

Reference is now being made to the flow diagram of FIG. 7 which illustrates one example embodiment of the present method for protecting content displayed on a fax confirmation page wherein portions of the detected text content are modified. Many aspects of the flow diagram of FIG. 7 mirror steps of the flow diagram of FIG. 5. In those steps wherein the processes are the same as was previously described above, duplicate explanations have been omitted for brevity. The reader is respectfully referred back to the discussion of the corresponding step(s) of FIG. 5 further additional context and other explanatory text.

At 702, a digital image of a page of a fax document is received. The document (fax job) is one which is to be transmitted via facsimile transmission.

At 704, content in a page of the digital image is identified which is to be displayed on a confirmation page. In one embodiment, the content is selected from a first page of the documents comprising the fax job.

At 706, detect text content of the content to be displayed. In one embodiment, text characters are identified using optical character software (OCR) known in the arts. For example, one freeware OCR software is SimpleOCR which is royalty-free and available on the Internet for developers to use in their custom applications.

At 708, a template of a fax confirmation page is obtained which is intended to be used for the present fax job.

At 710, the detected text is modified such that a spatial relationship between lines of the original text is preserved as in the original document. In one embodiment, the text is modified by drawing blank lines vertically through the text in a manner which will be described in detail herein below. Drawing vertical blank lines through the text renders the text displayed on the confirmation page no longer visibly legible to a reader thereof.

At 712, the modified text content is combined with the confirmation template sheet to generate a confirmation page for the fax job.

At 714, the generated new confirmation page is provided to an output device where the confirmation page is printed for the user.

Example Embodiment for Obscuring Text Content

When obscuring text content, one challenge to consider is that text size has an effect on the readability at a given sigma. Too high a sigma might cause too much information to be lost for the document to be recognizable. Two embodiments are provided herewith in order to overcome this limitation. These are: 1) Text size could be estimated for each row of text and an appropriate sigma applied to a rectangle encompassing that row of text. 2) An average text size can be estimated for which sensitive information is most likely to be expressed in.

For example, a large percentage of fax documents containing a social security number will not represent that number in 72 point font in a banner across the top of the page. A sigma value can be optimized that would render unreadable any text content determined to have a text size between, for instance, 8 and 20 points. The logic for this image manipulation would be added into existing image manipulation code in the device controller. In a similar fashion, such additional software constraints dealing with estimating font sizes could be added to existing image manipulation code that performs an image scaling. The blur manipulation could be accomplished in real time without impacting the performance of the machine noticeably. (i.e. existing processing and memory power will be sufficient).

Figure 8:
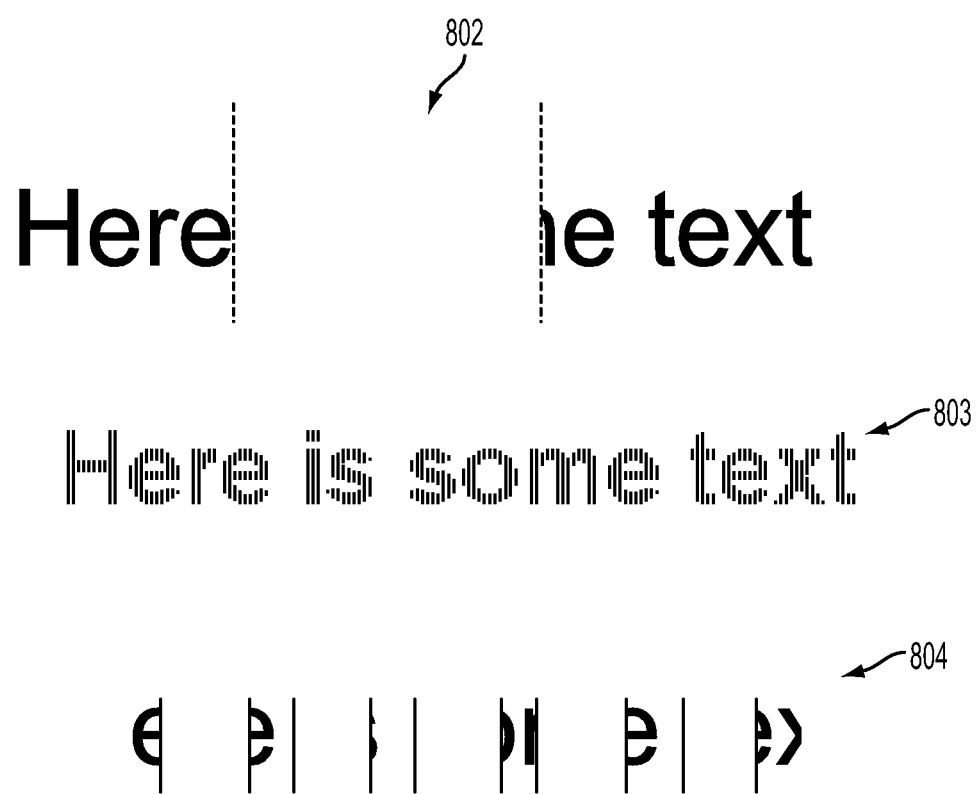
FIG. 8 illustrates the problems encountered with respect to the elimination of rows of text in the content which is to be displayed on the confirmation page.

In another embodiment, text content of the image can be altered or otherwise obscured by drawing evenly-spaced white strips vertically through the image content to blank out enough text to make personally identifiable information unreadable. One primary challenge of blanking out only select content portions is that the size of the text is unknown. Attention is respectfully directed to FIG. 8. As shown at 802, too infrequent blanking (cutting a single chunk of text out) might leave large chunks of unblanked text, potentially exposing an identifiable section of the content intended to be protected. At 803, too frequent blanking may only have the effect of halftoning the image, leaving the content to be protected quite legible. At 804 is shown one example of a vertical text deletion which does not suffer from the above-two identified problems. Thus, the proper frequency that will obscure the text needs to be identified while leaving glimpses of it visible so that the sender can clearly understand that their document was faxed correctly. The key is to divide the document into rows of text and to perform blanking of each row of text with a frequency appropriate to that row's text size. To achieve this, we take advantage of the relatively consistent ratio of a font's width to its height to arrive at a blanking frequency that will consistently obscure most of the text. One algorithm which can effectuate this is the following:

Step 1: For each line of text, determine the text height. This is done by averaging all the pixels in a row of the image to yield a 1-D representation of the edge of the image content. For each row, average y. This is done by summing the grayscale values of each pixel and dividing by the image width. Let w=image width in pixels; let h=the image height in pixels. Then, for each row from 1 to h, perform the following:

$$y = \frac{1}{w} \sum_{i=1}^{w} x_i. \quad (4)$$

Figure 9A:
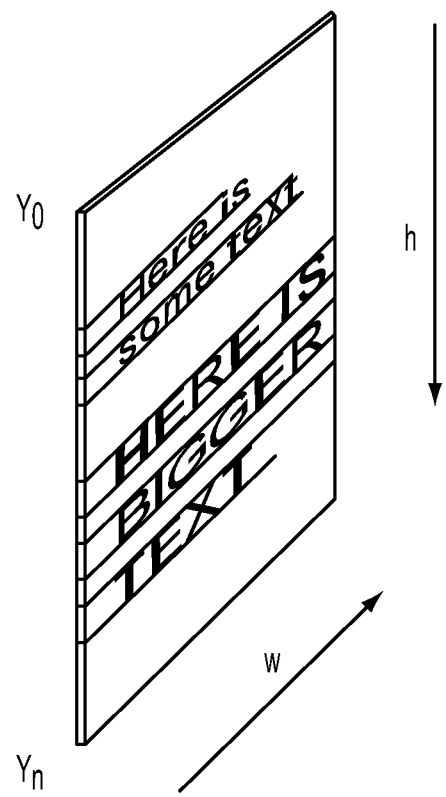
FIG. 9A shows row/height dimensions of an example portion of text content of a page of the scanned digital image.

The row/height dimensions of an example portion of text content of a page of the scanned digital image are shown in FIG. 9A.

This produces a vector $Y_0 \ldots Y_n$ whose values can be filter by a threshold to be either dark or light.

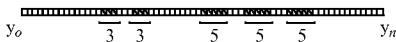

This achieves two things: Identifies the location of each row of text in the document and determines the size of that text height.

Figure 9B:
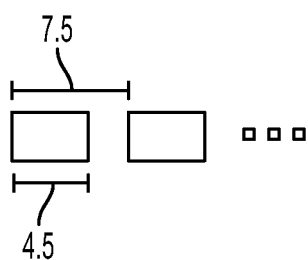
FIG. 9B shows a result of a blanking pattern computed for a detected text size of 3.

Step 2: For each row of text, calculate the frequency for placing blanking rectangles using the following parameters. In this example, we have two different text sizes, 3 and 5. $T_h$=Text height—this value is derived from the projection of text in this row. $W_b$=width of vertical white band=1.5×$T_h$. F=frequency of band placement=2.5×$T_h$. For a text size of 3:
$W_3$=1.5×3=4.5 pixels;
$F_3$=2.5×3=7.5 pixels.
Which yields a blanking pattern shown in FIG. 9B.

Figure 9C:
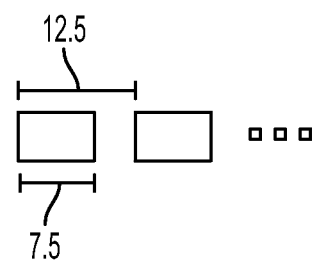
FIG. 9C shows a result of a blanking pattern computed for a detected text size of 5.

For a text size of 5:
$W_5$=1.5×5=7.5 pixels;
$F_5$=2.5×5=12.5 pixels.
Which yields a blanking pattern shown in FIG. 9C.

Step 3: For each row in the original image, apply the blanking with the determined parameters.

Figure 10A:
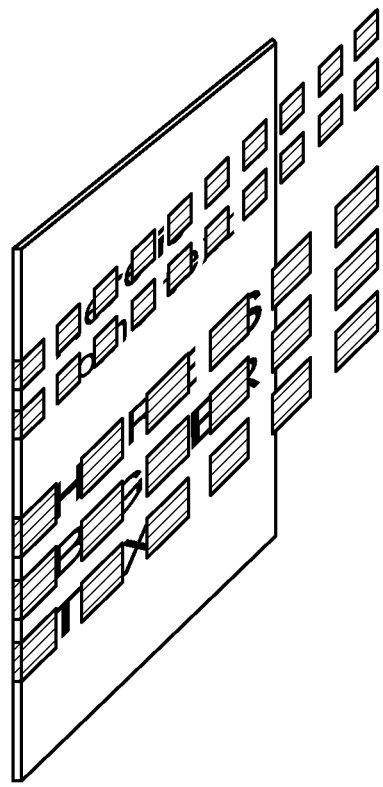
FIG. 10A shows a calculated blanking to be applied to an example portion of detected text.

Attention is respectfully directed to FIG. 10A which shows a calculated blanking to be applied to an example portion of detected text.

Figure 10B:
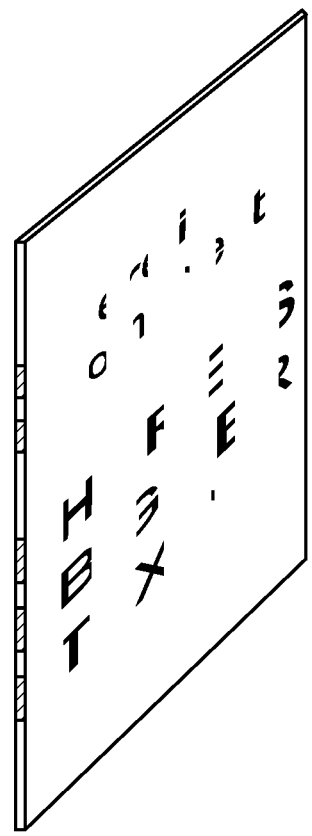
FIG. 10B shows a result of an application of the blanking of FIG. 9A applied to the detected text such that portions of the text are visually obscured.

Attention is respectfully directed to FIG. 10B which shows a result of an application of the blanking of FIG. 9A applied to the detected text such that portions of the text are visually obscured.

Alternative Embodiments of Obscuring Text

Alternatively, portions of the detected text are modified by replacing text with randomly selected characters and symbols. Attention is respectfully directed to FIG. 11 which illustrates the example confirmation page of FIG. 3 wherein sensitive text (as shown in area 1108) has been obscured by replacing characters thereof with randomly selected characters and symbols such that the text is rendered no longer visibly legible. In yet another embodiment, all or portions of the text words are redacted (removed entirely) or are blackened-out such that the blackened characters are no longer readable.

Software techniques and programming methods for removing random words of text and substituting character spaces for each of the characters of the removed words are well known. Further, blanking out text by substituting, for example, bolded X's for each of the letters in words of text are also known. As such, a further discussion as to programming code or other software constructs for performing such an implementation have been omitted. Other methods for modifying text content to be displayed on a fax confirmation page such that the text is no longer visibly legible are known and are intended to fall within the scope of the appended claims.

Reconstructing the Confirmation Page

The above-described embodiments have been directed to obscuring text displayed on the output confirmation page such that any sensitive information thereon is rendered visually illegible. An embodiment using a Gaussian blur function was described in detail and a software algorithm and other steps provided to facilitate that embodiment. Also, embodiments for selectively modifying characters or whole words of text content printed on the output confirmation page were also discussed. The sender of the fax would retrieve the confirmation page with the visually obscured or otherwise illegible text and keep a copy of the confirmation page for their records. However, instances may arise wherein, at a later date, the sender of the fax job desires to reconstruct the visually obscured protected information printed on the fax confirmation page. Such instances may arise, for instance, in a legal setting wherein the sender is required to submit documentary proof that their document was indeed faxed. Although the confirmation sheet legibly shows the time/date the fax job was sent, the obscured information displayed on the confirmation may not adequately substantiate which document had been faxed. As such, the sender may wish to reconstruct the fax confirmation back to an original form. What is also provided herein is an embodiment for reconstructing the printed confirmation sheet.

Reference is now being made to the flow diagram of FIG. 12 which illustrates one example embodiment of the present method for creating a confirmation page which can later be reconstructed. Duplicate explanations for steps which mirror process steps already explained with respect to the flow diagrams of FIGS. 5 and 7 have been omitted. The reader is respectfully directed to refer back to the explanations provided in the previous discussion if further clarification is needed.

At 1202, a digital image of a page of a fax document is received. The document (fax job) is one which is to be transmitted via facsimile transmission.

At 1204, content in a page of the digital image is identified which is to be displayed on a confirmation page. In one embodiment, the content is selected from a first page of the documents.

At 1206, the content is stored to a storage device. The identified content can be stored locally to a storage unit or is sent to a database in communication with a computer platform over the network (as discussed with respect to the networked environment of FIG. 4). Methods for storing images or portions of an image are well known. The identified content is cropped from the image file and stored in an image format such as JPG, JPEG, TIFF, GIF, BMP, and the like. A record of the stored image content can be readily obtained from the operating system or from the database engine wherein the image has been sent.

At 1208, a character sequence which references the storage location of the identified image content is created and stored with the stored content. The sequence can be any of a numeric sequence, filename, text string, file location, alphanumeric character sequence, barcode, or the like, which is capable of identifying and referencing the stored content for subsequent retrieval. The character sequence may refer to a location of a remote device over a network or on the Internet. Such alternatives are intended to fall within the scope of the appended claims. One example implementation involving database records will be discussed herein further with respect to the illustrated embodiment of FIG. 14. In one example, the location of the image file is saved to a folder in a file system which has been set aside for the storage of image content relating to fax confirmation pages. A folder wherein the image content of various fax jobs is stored can be easily password protected by a system administrator. Individual image files stored therein can be easily password protected on an individual basis after first soliciting the user to input a password (and preferably to confirm the entered password) through a graphical user interface which is associated with the device which either sent the fax job or which is configured to create the confirmation page for subsequent rendering. Alternatively, what is also stored with the content is any other information such as, for example, the time/date stamp, the sender's telephone number, the receiving devices telephone number, the number of pages scanned and transmitted, the number of pages information about the success of the fax transmission, and the like. Such other information can be retrieved along with the stored content at the time the confirmation page is reconstructed, as discussed with respect to the flow diagram of FIG. 15.

A hashing function may alternatively be used. Methods for hashing images, filenames, file locations, and the like, using a hash function are well established. A hash function refers to a function which takes a large digital object as an input and returns a much shorter binary string as a result. The resultant binary string often serves as an index into a hash table (or array). The returned value is called a hash value, a hash code, a hash sum, or simply a hash. Hash functions are widely used in conjunction with hash tables to quickly locate a record given a search key (headword). The hash function maps the search key to a slot in the table wherein the corresponding record is stored or wherein information about the real location of the corresponding record can be retrieved. A hashing function may map different search keys to the same value. Each slot of a hash table typically contains (implicitly or explicitly) a set of records rather than a single record. A good hash function will narrow a search to a relatively few table entries.

At 1210, a template of a fax confirmation page is obtained which is intended to be used for the present fax job.

At 1212, the identified content is modified such that the content is no longer visibly legible. Such a modification can be on an image basis using the above-described Gaussian blur or by modifying the text in accordance with the methods provided herein.

At 1214, the modified text content and the character sequence is combined with the confirmation template sheet to generate a confirmation page for the fax job.

At 1216, the generated new confirmation page is provided to an output device where the confirmation page is printed.

Figure 11:
FIG. 11 illustrates the example confirmation page of FIG. 3 wherein text displayed has been obscured by replacing characters thereof with randomly selected characters and symbols such that the text is rendered no longer visibly legible.
Figure 12:
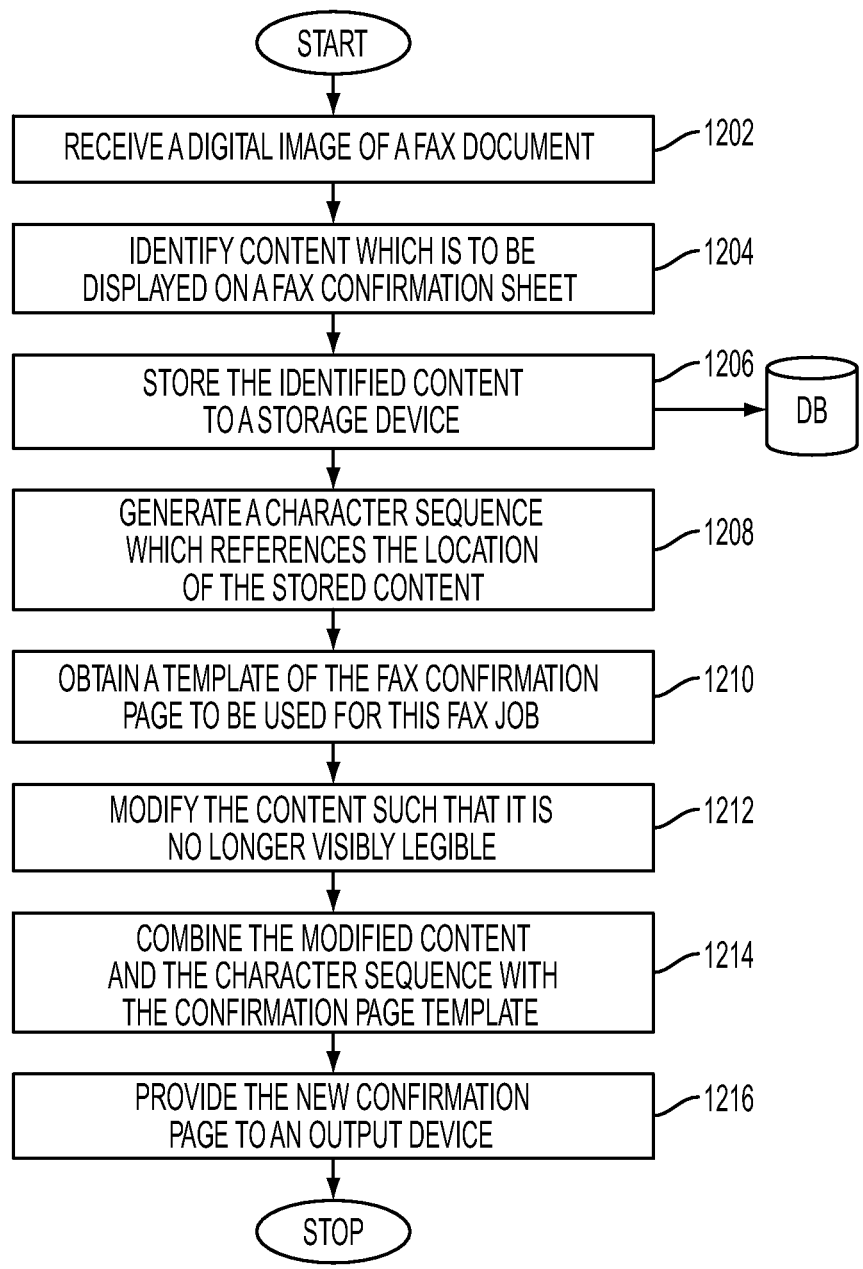
FIG. 12 is a flow diagram of one example embodiment of the present method for creating a confirmation page which can later be reconstructed
Figure 13:
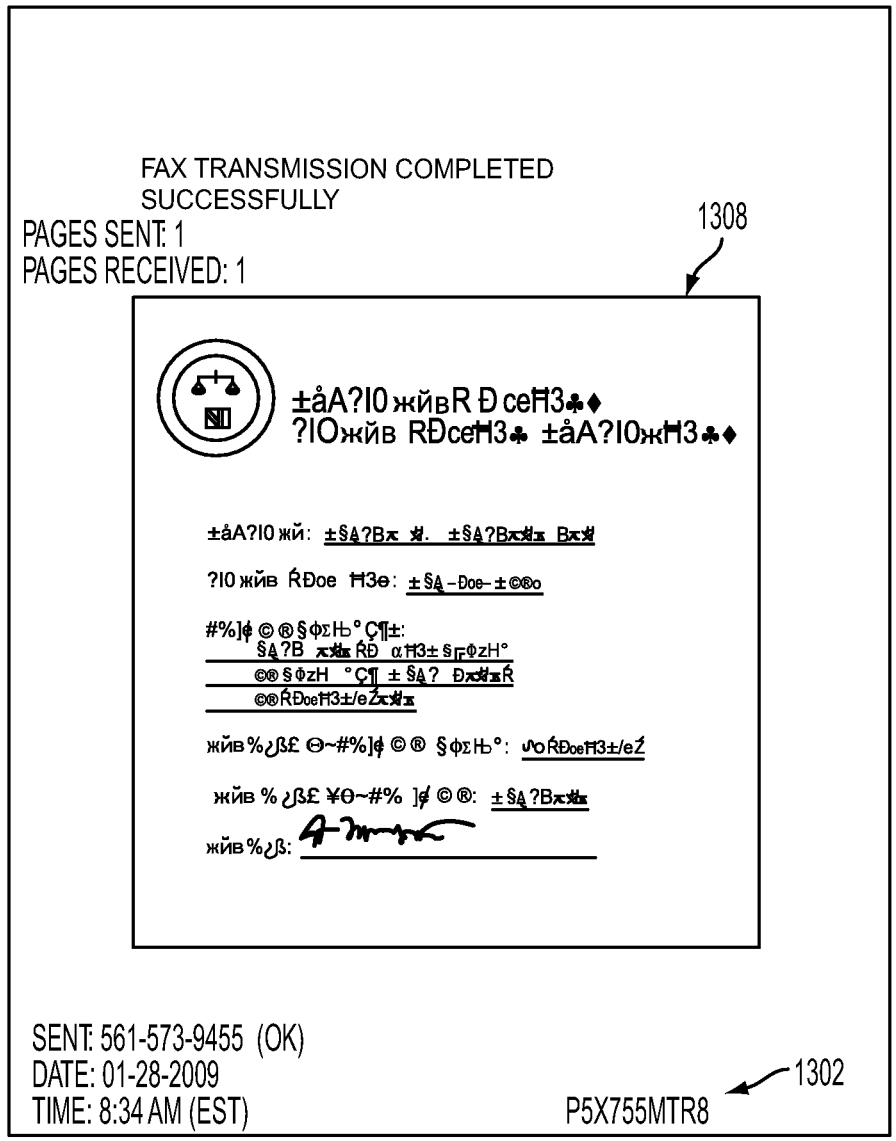
FIG. 13 illustrates the example confirmation page of FIG. 11 including the character sequence done in accordance with an alternative embodiment of reconstructing the confirmation page as described in the flow diagram of FIG. 12.

Attention is respectfully directed to FIG. 13 illustrating the example confirmation page of FIG. 11 shown including the character sequence 1302 generated in accordance with step 1208 of the flow diagram of FIG. 12. The obscured content is shown in area 1308 and corresponds to the original content shown in area 308 of the confirmation page of FIG. 3.

Figure 14:
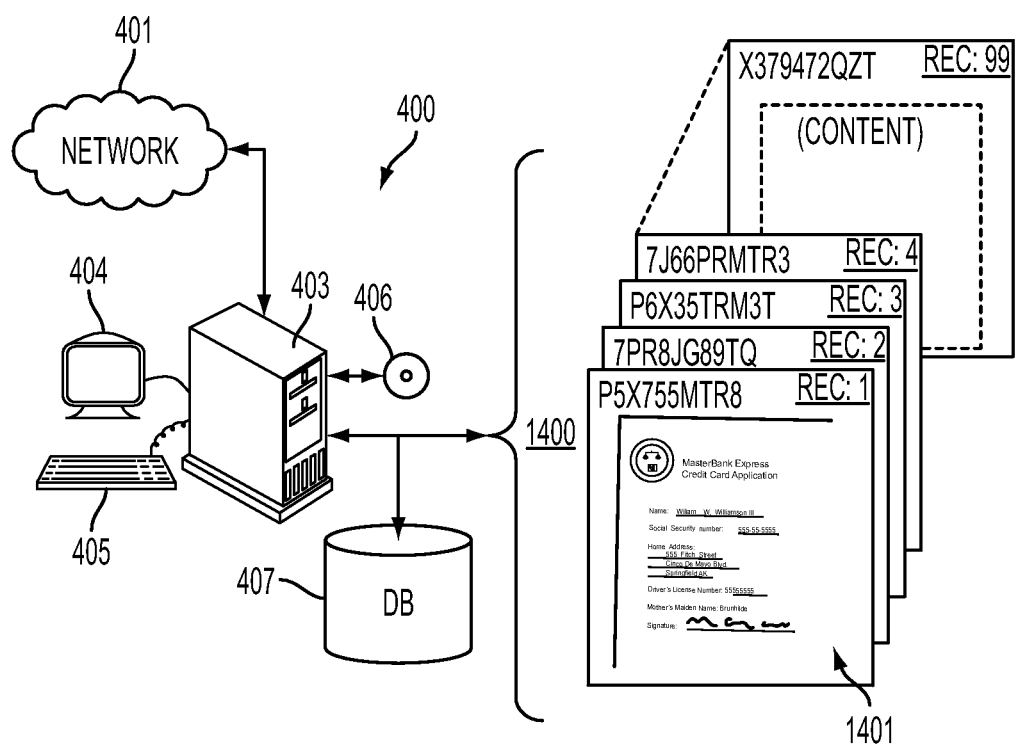
FIG. 14 illustrates an example plurality of content images stored in a database to show how the character sequence, created in FIG. 12, is used to reference a record stored in a database.

Reference is now being made to FIG. 14 which illustrates an example plurality of content images, collectively at 1400, which are presently stored in database 407 placed in communication with computer platform 400 of FIG. 4 and network 401. The example computer system is shown as described with respect to FIG. 4 and has a computer readable medium 496 for storing machine readable instructions for implementing various aspects hereof and for storing or otherwise transferring various records to/from the computer system 401. In the illustration, there are 99 records shown in sequential order. The records are intended to be illustrative.

As shown, each of the records in database 407 has a 10-character sequence associated therewith. The character sequence 1302 printed at the bottom of the confirmation page of FIG. 13 is used to reference the original content 1401. This can be a hash value derived from a function which hashes the image content. Alternatively, it can be a randomly generated alphanumeric character sequence which is then associated with the current record and created at the time the record is created, indexed, and stored. The content 1401 shown in Record #1, corresponds to the content 308 of the confirmation page of FIG. 3 having been stored in an unmodified form. Each of the other records illustrated in FIG. 14 have their respective contents associated therewith. Alternatively, the record points to a location wherein the content is stored. Various embodiments hereof are intended to fall within the scope of the appended claims.

Once the confirmation page has been printed with the character sequence which references the location of the stored original content, the confirmation page has to be reconstructed.

Figure 15:
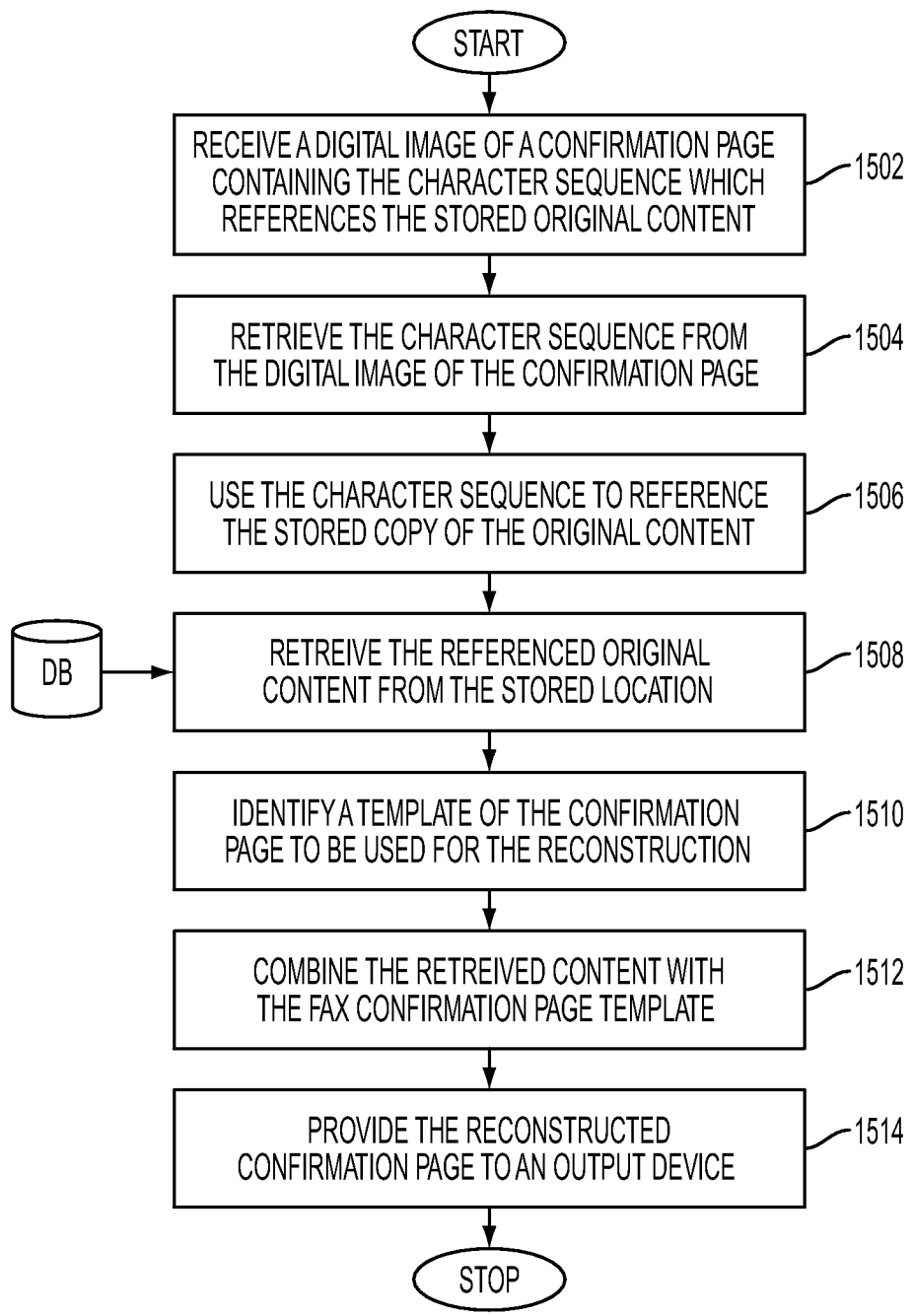
FIG. 15 is a flow diagram of one example embodiment of the present method for reconstructing a confirmation page which has been printed with a character sequence as shown in FIG. 13.

Reference is now being made to the flow diagram of FIG. 15 which illustrates one example embodiment of the present method for reconstructing the confirmation page which has been printed with a character sequence used to reference the original content displayed thereon.

At 1502, a digital image of the confirmation page containing the character sequence is received. In one embodiment, the digital image is received using a document scanning device.

At 1504, the character sequence is retrieved from the digital image of the confirmation page. The character sequence is printed in a data field or a location on the confirmation page which is known. Thus, this location of the scanned image can be identified and examined using OCR software to reproduce the character sequence printed thereon.

At 1506, the retrieved character sequence is used to reference the location of the original content. In the example of FIG. 14, the retrieved character sequence is provided to the database in the form of a search query string. The database engine formats the query string using, for example, a query optimizer. The database records are then searched for the character sequence matching the query string. In this example, string "P5X755MTR8" matches the very first record (REC 1) among the plurality of records (1400 of FIG. 14). The content stored in the matching record is retrieved. Alternatively, the records are searched sequentially until a recording is found which matches the retrieved character sequence. Methods for search records containing a matching character sequence are well known in the computer science arts. As such, example source code to perform a character matching function on text has been omitted.

At 1508, the original content is retrieved from its storage location. Any other information also stored in the data record along with the original content is retrieved. Such information may be, for example, the time/date stamp, the sender's telephone number, the receiving devices telephone number, the number of pages scanned and transmitted, the number of pages information about the success of the fax transmission, and the like.

At 1510, a template of a fax confirmation page is identified and obtained which is to be used to reconstruct the confirmation page. The correct confirmation page template to be used herein can be identified by a data field which is stored with the matching record at the time the record is created.

A 1512, the retrieved original content is combined with the fax confirmation page template to generate a new confirmation page.

At 1514, the newly reconstructed confirmation page is provided to an output device for the user. In this example, the reconstructed confirmation page would be the original un-modified confirmation page of FIG. 3.

In such a manner, the confirmation page can be quickly reconstructed with the original content information. Since image files are relatively small, large amounts of content images, for example in JPEG format, can be stored without impacting available storage drive space. Various other file formats can also be implemented.

Although the embodiment for reconstructing the confirmation page is discussed with respect to a method which stores a un-modified copy of the content in a record stored in a database, as shown in FIG. 14, alternative methods can also be implemented. For example, an image which has been blurred using a Gaussian blur function can be reconstructed (de-blurred) by performing an inverse operation of the function which was used to blur the image. The Gaussian blur function used to blur the image and the inverse of the Gaussian blur function can be stored in a record. When the user desires to reconstruct the confirmation page, the inverse Gaussian function is retrieved from the stored record and that retrieved function is applied to the blurred image to effectively restore the image to its original un-blurred state. Alternatively, information about the various function(s) and/or technique(s) used to modify the text to obscure the content of the output confirmation page, i.e., via vertical blanking, character replacement, word deletion, redacting (blackening), and the like, can be stored in a record which is associated with the confirmation page. This information can be subsequently retrieved and the inverse operation performed to reconstruct the modified content back to its original form/state. As such, it should be appreciated that the method provided herein for reconstructing the confirmation page is but one example. Other methods for performing an inverse operation on the modified content and for storing and retrieving the information needed to reconstruct the confirmation page to an original form are intended to fall within the scope of the appended claims.

A Graphical User Interface

Figure 16A:
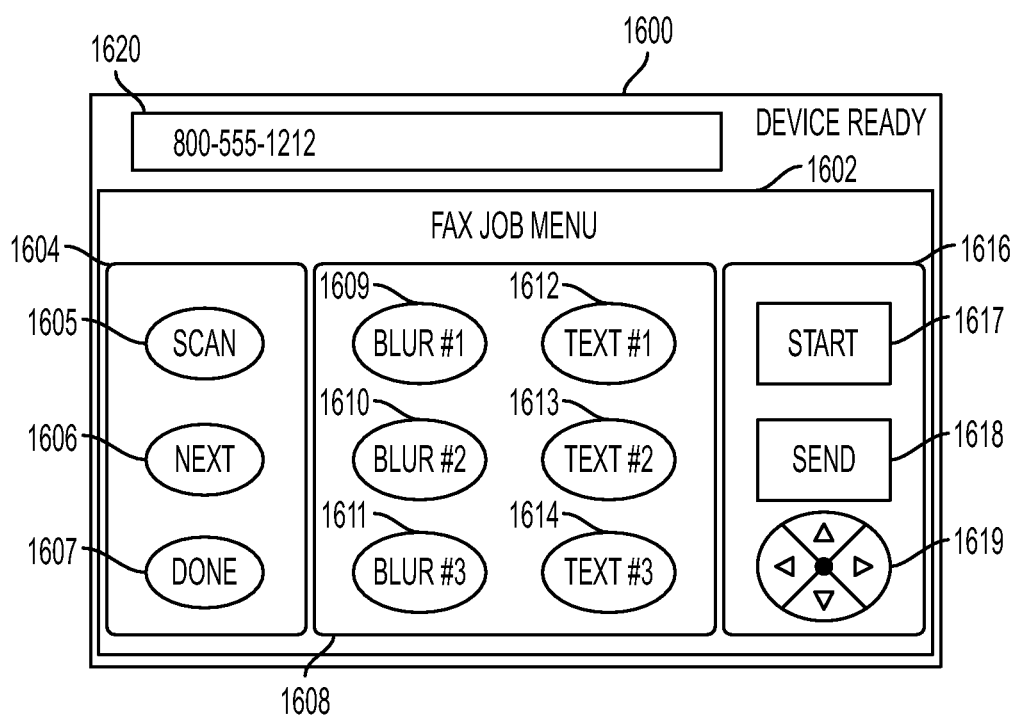
FIG. 16A illustrates a topside view of an example touchscreen that would appear to an operator thereof displayed on an example graphical user interface wherein a user inputs one or more options which implement various features and aspects of the present method.
Figure 16B:
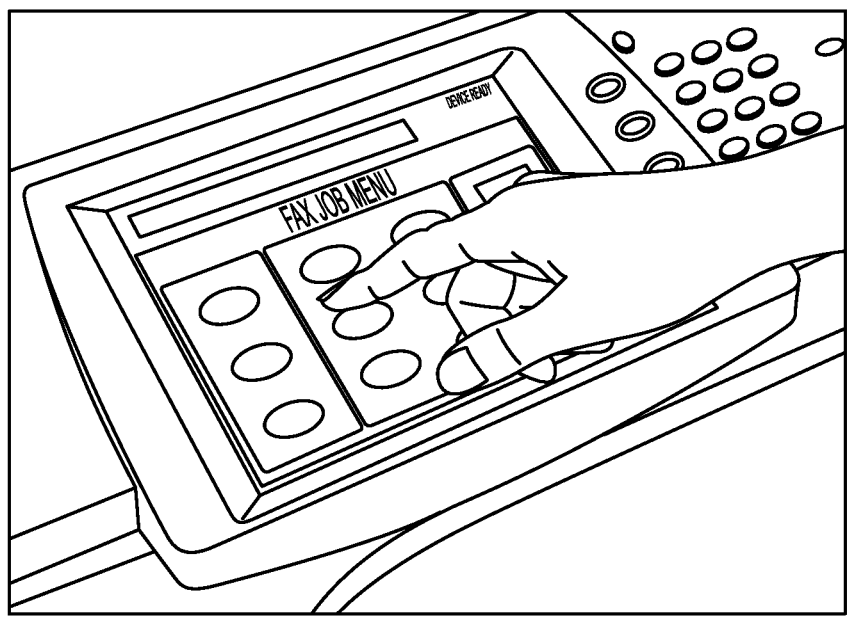
FIG. 16B illustrates an elevated angular view of an example graphical user interface whereon the selectable menu options of FIG. 16A are displayed, and implemented as part of any of the computer platform and/or the multifunction devices of FIG. 4.

Reference is now being made to FIGS. 16A-B which illustrates a topside view of a touchscreen that would appear to an operator thereof displayed on an example graphical user interface wherein a user provides inputs to one or more selectable options which implement various features and aspects of the present method. The example menu options of FIG. 16A shown and discussed with respect to the example GUI of FIG. 16B are illustrative and are intended to provide one example menu screen and interface implemented as part of any of the computer platform 400 and/or the interface 412 of the multi-function devices 402 of FIG. 4. As such, the embodiments of FIGS. 16A-B should not be construed as being limiting in any manner. For example, in another embodiment of a graphical user interface, the user is provided with a keyboard and/or a keypad for the entry of data, such as for instance the telephone number of the destination device to which the fax job is intended to be transmitted.

As shown in FIG. 16A, touchscreen 1600 has displayed thereon a menu 1602. It should be appreciated that the menu is driven by a software program containing machine readable instructions executed by a processor (not shown) which is in digital communication with programs, DLLs, and drivers, along with various other hardware/software constructs which have collectively been designed to implement the functionality of a touchscreen display. Such displays are commonly found in various streams of commerce and are widely available for a plurality of devices and in a wide diversity of designs and implementations.

The menu 1602 has displayed thereon the heading "FAX JOB MENU". This menu option would have been displayed in response to a previous menu selection having been selected by the user in anticipation of performing one or more aspects of the present method which brought the user to the current menu displayed. As shown, the example menu is divided in 3 areas.

A first menu area 1604 (to the far left of the menu display) provides three user-selectable buttons on the touchscreen display which enable the user to input the documents to be faxed. Button 1605, labeled "SCAN", when selected by the user scans the current page of the document which has been placed face-down on the glass platen of the scanning device. The pages of the scanned document make up the pages of the received digital image which, in turn, comprises the fax job to be sent. Button 1606, labeled "NEXT", when selected initiates the scanning of the next page of the document to be scanned. Button 1607, labeled, "DONE", when selected instructs the underlying fax menu software that all the documents comprising the current fax job have been scanned and that no further documents will be digitized.

A second menu area 1608 (in the center of the menu display) provides six user-selectable buttons on the touchscreen display which enable the user to select the desired method for protecting the information displayed on the confirmation page printed in response to the completion of their fax job. Buttons 1609-1611, when selected, enable the user to select one of 3 blurring operations to be applied to their image content in a manner in accordance with one or more embodiments of the present method described above. In one example, a first blurring function, user-selectable through button 1609, blurs the identified content via a Gaussian blur in a 5 pixel wide kernel with a Gaussian weight of [1, 5, 10, 5, 1] which will blur the content to a certain $1^{st}$ degree. A second blurring function, user-selectable through button 1610, implements a Gaussian blur function with a value of sigma which blurs the content to an even greater degree than button 1609. Button 1611 implements yet an even greater degree of blurriness to the output image. The blurred content of FIG. 6 might have been produced by a user selection of this menu option such that the personal content of the fax job was blurred to a high degree.

A second column of user-selectable buttons 1612-1614 provide the user with varying options of modifying the text of the content in accordance with the various embodiments described herein. For example, in one embodiment, a user selection of button 1612 generates a plurality vertical blanked lines through the detected text in a manner as discussed with respect to FIGS. 9-10. A user selection of button 1613, for example, modifies the detected text such that characters of the text are replaced by random characters and symbols in a manner as discussed with respect to the embodiment of FIG. 13. Button 1614, for example, when selected by a user redacts the document by blanking out whole words from the detected text according to a random ordering.

A third menu area 1616 (to the right of the menu display) provides three buttons which enable the user to initiate various options. For example, button 1617, labeled "START", enables the user to start processing a fax job. Button 1618, labeled "SEND", enables a user to send the scanned fax job. Button 1619, in the illustrated embodiment, enables the user to navigate (left, right, up, down) through items displayed in window 1620. As shown, the user scrolls through the fax numbers stored in a memory of the multifunction device to select the telephone to which the user wishes to transmit the fax. It should be appreciated that the menu options are illustrative and that other combinations, features, enhancements, and options can be programmed depending on the desired objectives of the end-user.

Various Other Embodiments

Figure 17:
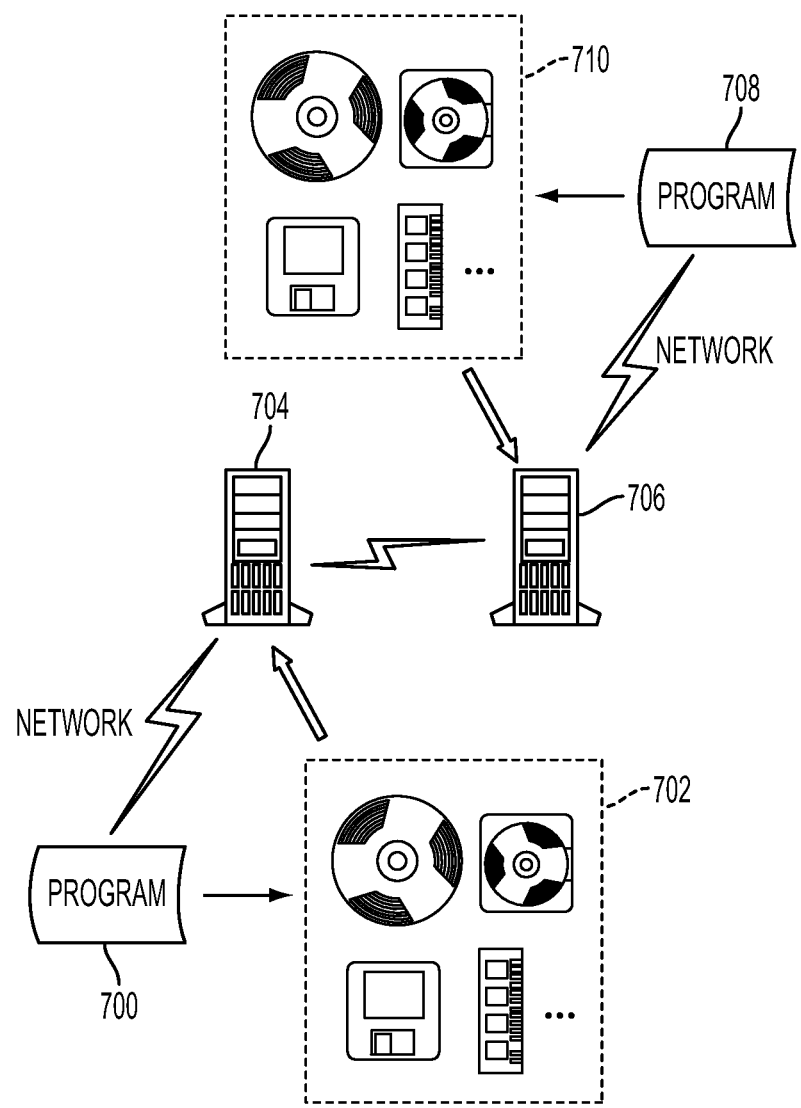
FIG. 17 is an explanatory diagram illustrating one example of a computer readable storage medium capable of storing machine readable instructions which, when mounted on a computer system, causes the system to perform one or more aspects of the present method.

Reference is now being made to FIG. 17 which is an explanatory diagram illustrating one example of a computer readable storage medium capable of storing machine readable instructions which, when mounted on a computer system, cause the computer system to perform one or more aspects of the present method as described above in detail. One or more computer program instructions 1700 for carrying out one or more aspects of the present method are loaded on a computer readable media 1702. Various embodiments of a computer readable media include optical disks (CD-ROM etc.), magnetic disks, magnetic cards, memories (including IC cards and memory card), and the like. The storage media stores the machine readable program instructions for transport and storage by changing magnetic, optical, and/or energy states of the media in response to program description instructions having been transferred thereon. The storage medium can then be mounted on computer system 1704 and the machine readable program instructions contained in the computer readable medium executed by a processor. The machine readable instructions loaded onto computer system 1704 can be transmitted or otherwise communicated to computer system 1706 and, in turn, mounted thereon for subsequent execution. The machine readable program instructions can be transferred over a network in original form or modified or incorporated with another program 1708 and stored on storage media 1710. The computer systems shown include one or more processors and/or a special purpose computer systems capable of executing machine readable program instructions for carrying out one or more aspects of the present method as described herein. This illustration shows that the machine readable instructions may be executed by one computer system, modified, and transferred to another computer system and off-loaded onto yet another computer program product.

One or more aspects of the present method can be implemented on a special purpose computer system. Such a special purpose system may be any of a micro-processor or micro-controller, ASIC, electronic circuit, or hardware designed to effectuate any aspect of the present method. Such a special purpose computer can be integrated, in whole or in part, with any of the multifunction devices or as part of the computer system shown and discussed with respect to the networked environment of FIG. 4.

One example special purpose computer includes a processor capable of executing machine readable program instructions for carrying out one or more aspects of the present method for protecting information displayed on a fax confirmation sheet or for reconstructing a fax confirmation to its original form. The processor may further execute the underlying programs handing the displayed user-selection menu options (of FIG. 16A) and/or one or more aspects of the touchscreen display (of FIG. 16B). One such special purpose system includes a main memory for storing machine readable instructions and may further include random access memory (RAM) to support reprogramming and flexible data storage. The main memory may further include one or more buffers to store executable machine program instructions that implement the methods herein. The special purpose system may further include a secondary memory such as, for example, a hard disk drive and/or a removable storage unit which reads/writes to a removable storage device such as a floppy disk, magnetic tape, optical disk, etc., to store data, software, source code, algorithms, and any other machine readable instructions required to implement the teachings hereof. The secondary memory may additionally include various other mechanisms for allowing computer programs or other machine executable instructions to be loaded into the processor for execution. Such mechanisms may include removable storage adapted to exchange data through an interface. Examples of other such mechanisms include a program cartridge and interface such as that found in video game devices, a removable memory chip such as an PROM, EPROM, EEPROM, and the like, and associated socket(s), and other storage units and interfaces which effectuate the transfer of software and/or data. Such a special purpose system additionally includes a communications interface which acts as both an input and an output to allow software and data to be transferred to/from one or more external devices. Examples of a communications interface include a modem, a network interface such as an Ethernet card, a communications port, a PCMCIA slot and card, etc. Software and data are transferred via the communications interface in the form of signals comprising bits of data. Such transferred signals may be in the form of electronic, electromagnetic, optical, radio, RF, and/or other signals capable of being transmitted and received via a communications channel configured to carry such signals. Example communications channels include wire, cable, fiber optic, phone line, cellular link, RF link, and/or other data transmission means. The special purpose computer system may additionally include a display interface that forwards data to a display device, such as a touchscreen display, or a monitor, and may be further placed in communication with a scanning device capable of receiving images of scanned documents and transforming the received images in electronic format. Such a scanning device would be capable of determining color intensity, magnitude, pixel location, spatial variation, and the like, from the pixels comprising the scanned image. The computer system may also be placed in communication with one or more electronic media readers for the transference of data to/from a database or other storage media in communication therewith.

All or portions of the flow diagrams of the present method may also be implemented partially or fully in hardware in conjunction with machine executable instructions. A network connection may be utilized for receiving source image color data points over a network such as an intranet or internet.

The term computer program product is intended to include any computer readable medium, computer executable medium, computer usable medium, or machine readable media capable of providing instructions and/or data to a computer system for implementing one or more aspects of the present method as described above. The computer program product is capable of storing data, instructions, messages packets, or other machine readable information, and includes non-volatile memory, such as a floppy disk, hard drive and volatile memory such as ROM, RAM, flash, and the like. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer program product may additionally contain information held in a transitory state such as a network link or a network interface which may include a wired network or a wireless network which allows a computer to read such computer readable information.

It should be understood that the flow diagrams of the present method are illustrative. Other operations, for example, may be added, modified, enhanced, condensed, integrated, or consolidated. Variations thereof are intended to fall within the scope of the appended claims. It should also be understood that one or more aspects of the present method are intended to be incorporated in an article of manufacture, including one or more computer program products.

The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

APPENDIX

EXAMPLE SOURCECODE TO PERFORM A GAUSSIAN BLUR

```
gaussianblur.h
// gaussianblur.h - declaration of template class
// of 1D and 2D gaussian blur or filter
//
// The code is property of LIBROW
// You can use it on your own
// When utilizing credit LIBROW site
#ifndef_GAUSSIANBLUR_H_
#define_GAUS SIANBLUR_H_
template <class T = double> class TGaussianBlur
{
public:
   // 1D GAUSSIAN BLUR
   // pSignal - input signal;
   // pResult - output signal, NULL for inplace processing
   // N - length of the signal
   // W - window size, odd positive number
   bool Filter(T *pSignal, T *pResult, unsigned int N, unsigned int W) const;
   // 2D GAUSSIAN BLUR
   // pImage - input image
   // pResult - output image, NULL for inplace processing
   // N - width of the image
   // M - height of the image
   // W - window size, odd positive number
   bool Filter(T *pImage, T *pResult, unsigned int N, unsigned int M, unsigned int W) const;
protected:
   // Internal auxiliary structure - data array size descriptor
   struct CSize
   {
      unsigned int x; // Array width
      unsigned int y; // Array height
      // Default constructor
      CSize( ): x(0), y(0) { }
      // Constructor with initialization
      CSize(unsigned int_x, unsigned int_y): x(_x), y(_y) { }
      // Initialization
      void Set(unsigned int_x, unsigned int_y) {x =_x; y =_y; }
      // Area
      unsigned int Area( ) const { return x * y; }
```

APPENDIX-continued

EXAMPLE SOURCECODE TO PERFORM A GAUSSIAN BLUR

```cpp
    };
    // Internal auxiliary structure - array descriptor
    struct CArray
    {
        CSize Size; // Array size
        T *Buffer; // Element buffer
        // Default constructor
        CArray( ): Buffer(NULL) { }
        // Constructors with initialization
        CArray(T *_Buffer, const CSize &_Size): Buffer(_Buffer), Size(_Size) { }
        CArray(T *_Buffer, unsigned int _N): Buffer(_Buffer), Size(_N, 1) { }
    };
    // Internal auxiliary structure - array extension descriptor
    struct CExtension: public CArray
    {
        unsigned int Margin; // Extension margins
        enum EMode {ModeHorizontal, ModeVertical };
        // Default constructor
        CExtension( ): Margin(0), Mode(ModeHorizontal) { }
        // Destructor
        ~CExtension( ) { if (Buffer) delete[ ] Buffer; }
        // Mode setting
        void SetMode(EMode _Mode) { Mode =_Mode; }
        // Extension memory allocation
        bool Allocate(unsigned int _N, unsigned int _W) { return _Allocate(CSize(_N, 1), _W >> 1);
}
        bool Allocate(const CSize &_Size, unsigned int_W) { return_Allocate(_Size,_W >> 1 ); }
        // Pasting data into extension from data array
        void Paste(const T *_Start);
        // Extension
        void Extend( );
    protected:
        EMode Mode; // Current mode
        // Extension memory allocation
        bool_Allocate(const CSize &_Size, unsigned int_Margin);
    };
    // Internal auxiliary structure - filter window descriptor
    struct CWindow
    {
        double *Weights; // Window weights
        unsigned int Size; // Window size
        // Default constructor
        CWindow( ): Weights(NULL), Size(0), Correction(.5 - double(T(.5))) { }
        // Destructor
        ~CWindow( ) { if (Weights) delete[ ] Weights; }
        // Filter window creation
        bool Create(unsigned int_Size);
        // FILTER WINDOW APPLICATION
        // _Element - start element in signal/image
        T Apply(const T *_Element) const
        {
            // Apply filter - calculate weighted mean
            double Sum = 0.;
            const double *WeightIter = Weights;
            const T *ElIter =_Element;
            const double *const End =Weights + Size;
            while (WeightIter < End)
                Sum +=*(WeightIter++) * double(*(ElIter++));
            return T(Sum + Correction);
        }
    protected:
        const double Correction;
    };
    // Internal auxiliary functions - check input data consistency
    bool Consistent(const T *_Image, const CSize &_Size, unsigned int _W) const { return _Image &&
_Size.x && _Size.y &&_W &&_Size.x > (_W >> 1) &&_Size.y > (_W >> 1) &&_W & 1; }
    bool Consistent(const T *_Signal, unsigned int_N, unsigned int _W) const {return_Signal &&_N
&&_W &&_N > (_W >> 1) &&_W & 1; }
};
// Include implementation file
#include "gaussianblur.cpp"
#endif
-------------------------------------------------------------
// gaussianblur.cpp - implementation of template class
// of 1D and 2D gaussian blur or filter
//
// The code is property of LIBROW
```

APPENDIX-continued

EXAMPLE SOURCECODE TO PERFORM A GAUSSIAN BLUR

```cpp
// You can use it on your own
// When utilizing credit LIBROW site
#ifndef_GAUSSIANBLUR_CPP_
#define_GAUSSIANBLUR_CPP_
// Include declaration file
#include "gaussianblur.h"
// Include math library
#include <math.h>
// 1D GAUSSIAN BLUR
// pSignal - input signal;
// pResult - output signal, NULL for inplace processing
// N - length of the signal
// W - window size, odd positive number
template <class T> bool TGaussianBlur<T>::Filter(T *pSignal, T *pResult,
unsigned int N, unsigned int W)
const
{
   // Check input data consistency
   if (!Consistent(pSignal, N, W))
      return false;
   // Allocate extension
   CExtension Extension;
   if (!Extension.Allocate(N, W))
      return false;
   // Create signal descriptor
   const CArray Signal(pSignal, N);
   // Paste signal into extension
   Extension.Paste(Signal.Buffer);
   // Extend signal
   Extension.Extend( );
   // Create filter window
   CWindow Window;
   if (!Window.Create(W))
      return false;
   // Extension iterator
   const T *ExtIter = Extension.Buffer;
   // Extension stop position
   const T *const ExtStop = Extension.Buffer + Extension.Size.x;
   // Result iterator
   T *ResIter = pResult ? pResult : pSignal;
   // Filter - apply to every element
   while (ExtIter < ExtStop)
      *(ResIter++) = Window.Apply(ExtIter++);
   // Succeeded
   return true;
}
// 2D GAUSSIAN BLUR
// pImage - input image
// pResult - output image, NULL for inplace processing
// N    -width of the image
// M    -height of the image
// W    -window size
template <class < T> bool TGaussianBlur <T>::Filter(T *pImage, T *pResult,
unsigned int N, unsigned int M,
unsigned int W) const
{
   // Check input data consistency
   if (!Consistent(pImage, CSize(N, M), W))
      return false;
   // Allocate extension
   CExtension Extension;
   if (!Extension.Allocate(CSize(N, M), W))
      return false;
   // Create image descriptor
   CArray Image(pImage, CSize(N, M));
   // Create filter window
   CWindow Window;
   if (!Window.Create(W))
      returnfalse;
   // Stop postion
   const T * ExtStop = Extension.Buffer + Extension.Size.x;
   // Result iterator
   T *ResIter = pResult ? pResult : pImage;
   // Image iterator
   const T *ImIter = Image.Buffer;
   // Image stop position
   const T * ImStop = Image.Buffer + Image.Size.Area( );
   // Filter line by line
```

APPENDIX-continued

EXAMPLE SOURCECODE TO PERFORM A GAUSSIAN BLUR

```
    while (ImIter < ImStop)
    {
      // Paste image line into extension
      Extension.Paste(ImIter);
      // Extend image line
      Extension.Extend( );
      // Extension iterator
      const T *ExtIter = Extension.Buffer;
      // Apply filter to every pixel of the line
      while (ExtIter < ExtStop)
        *(ResIter++) = Window.Apply(ExtIter++);
      // Move to the next line
      ImIter+=Image.Size.x;
    }
    // Initialize image descriptor with filter result
    Image.Buffer = pResult ? pResult : pImage;
    // Set vertical extension mode
    Extension.SetMode(CExtension::ModeVertical);
    // Extension stop position
    ExtStop = Extension.Buffer + Extension.Size.y;
    // Result column iterator
    T *ResColumnIter = pResult ? pResult : pImage;
    // Image iterator
    Imiter = Image.Buffer;
    // Image stop position
    ImStop = Image.Buffer + Image.Size.x;
    // Filter column by column
    while (ImIter < ImStop)
    {
      // Paste image column into extension
      Extension.Paste(ImIter++);
      // Extend image column
      Extension.Extend( );
      // Extension iterator
      const T *ExtIter = Extension.Buffer;
      // Result pixel iterator
      ResIter = ResColumnIter;
      // Apply filter to every pixel of the column
      while (ExtIter < ExtStop)
      {
        *ResIter = Window.Apply(ExtIter++);
        ResIter += Image.Size.x;
      }
      // Move to the next column
      ++ResColumnIter;
    }
    // Succeeded
    return true;
}
// EXTENSION MEMORY ALLOCATION
// _Size - signal/image size
// _Margin - extension margins
template <class T> bool TGaussianBlur<T>::CExtension::_Allocate
(const CSize &_Size, unsigned int _Margin)
{
    // Allocate extension buffer
    Buffer = new T[(_Size.x >_Size.y ?_Size.x :_Size.y) + (_Margin << 1)];
    // Check buffer allocation
    if (!Buffer)
      // Buffer allocation failed
      return false;
    // Initialize size descriptors
    Size =_Size;
    Margin =_Margin;
    // Succeeded
    return true;
}
// PASTING DATA LINE/COLUMN INTO EXTENSION FROM DATA ARRAY
// _Start - start postion in image/signal to paste from
template <class T> void TGaussianBlur <T>::CExtension::Paste(const T *const_Start)
{
    if (Mode == ModeHorizontal)
    {
      // Paste line
      memcpy(Buffer + Margin, _Start, Size.x * sizeof(T));
    }
    else
    {
```

APPENDIX-continued

EXAMPLE SOURCECODE TO PERFORM A GAUSSIAN BLUR

```
    // Stop position
    const T *const Stop = _Start + Size.Area( );
    // Array iterator
    const T *ArrIter = _Start;
    // Extension iterator
    T *ExtIter = Buffer + Margin;
    // Paste array column element by element
    while (ArrIter < Stop)
    {
      // Copy line
      *(ExtIter++) = *ArrIter;
      // Jump to the next line
      ArrIter += Size.x;
    }
  }
}
// EXTENSION CREATION
template <class T> void TGaussianBlur<T>::CExtension::Extend( )
{
  // Line size
  const unsigned int Line = Mode = ModeHorizontal ? Size.x : Size.y;
  // Stop position
  const T *const Stop = Buffer - 1;
  // Left extension iterator
  T *ExtLeft = Buffer + Margin - 1;
  // Left array iterator
  const T *ArrLeft = ExtLeft + 2;
  // Right extension iterator
  T *ExtRight = ExtLeft + Line + 1;
  // Left array iterator
  const T *ArrRight = ExtRight - 2;
  // Create extension line element by element
  while (ExtLeft > Stop)
  {
    // Left extension
    *(ExtLeft--) =*(ArrLeft++);
    // Right extension
    *(ExtRight++) = *(ArrRight++);
  }
}
// FILTER WINDOW CREATION
// _Size - window size
template <class T> bool TGaussianBlur<T>::CWindow::Create(unsigned int_Size)
{
  // Allocate window buffer
  Weights = new double[_Size];
  // Check allocation
  if (!Weights)
    // Window buffer allocation failed
    returnfalse;
  // Set window size
  Size = _Size;
  // Window half
  const unsigned int Half = Size >> 1;
  // Central weight
  Weights[Half] = 1.;
  // The rest of weights
  for (unsigned int Weight = 1; Weight < Half + 1; ++Weight)
  }
    // Support point
    const double x =3.* double(Weight) / double(Half);
    // Corresponding symmetric weights
    Weights [Half – Weight] = Weights[Half + Weight] = exp(-x * x / 2.);
  }
  // Weight sum
  double k = 0.;
  for (unsigned int Weight = 0; Weight < Size; ++Weight)
    k += Weights[Weight];
  // Weight scaling
  for (unsigned int Weight = 0; Weight < Size; ++Weight)
    Weights[Weight] /=k;
  // Succeeded
  return true;
}
#endif
```

END OF EXAMPLE SOURCECODE

What is claimed is:

1. A method for protecting content printed on a fax confirmation sheet which contains an image of a first page of a faxed document, the method comprising:
receiving a digital image of a fax document;
identifying content in a first page of said digital image to be displayed on a fax confirmation page;
modifying, selectively, one or more characters of said identified content, within a given text size with other visible markings, such that said one or more characters with said substituted visible markings is no longer visibly legible by blurring said identified content using a Gaussian blur function with a value of sigma, where sigma is selected based on said given text size for each row of text;
obtaining a template of said fax confirmation page for said fax document;
combining said modified content with said retrieved fax confirmation page template, said combination comprising said fax confirmation page, said modified content being combined with said fax confirmation page template in a manner which preserves a spatial relationship of content as it appears on said first page; and
providing said fax confirmation page to an output device.

2. The method of claim 1, wherein modifying at least a portion of said detected text comprises any of:
replacing at least some characters of said detected text with other characters and symbols;
deleting some words of said detected text; and
drawing blank vertical lines through characters of said detected text.

3. The method of claim 1, further comprising:
storing a copy of said identified content to a storage device before modifying said content; and
printing on said confirmation page a character sequence which references said copy of said identified content on said storage device.

4. The method of claim 3, further comprising reconstructing said confirmation page by:
receive a digital image of said confirmation page containing said character sequence;
retrieving said character sequence from said digital image of said confirmation page;
referencing said stored content using said retrieved character sequence;
retrieving said identified content from said storage device;
obtaining a new template of a fax confirmation page for said fax document;
combining said retrieved content with said new fax confirmation template; and
providing said new confirmation page to an output device.

5. A system for protecting content printed on a fax confirmation sheet which contains an image of a first page of a faxed document, the system comprising:
a memory and a storage medium for storing data; and
a processor in communication with said storage medium and said memory, said processor executing a machine readable instructions for performing:
receiving a digital image of a fax document;
identifying content in a first page of said digital image to be displayed on a fax confirmation page;
modifying, selectively, one or more characters of said identified content, within a given text size with other visible markings, such that said one or more characters with said substituted visible markings is no longer visibly legible by blurring said identified content using a Gaussian blur function with a value of sigma, where sigma is selected based on said given text size for each row of text;
obtaining a template of said fax confirmation page for said fax document;
combining said modified content with said retrieved fax confirmation page template, said combination comprising said fax confirmation page, said modified content being combined with said fax confirmation page template in a manner which preserves a spatial relationship of content as it appears on said first page; and
providing said fax confirmation page to an output device.

6. The system of claim 5, wherein modifying at least a portion of said detected text comprises any of:
replacing at least some characters of said detected text with other characters and symbols;
deleting some words of said detected text; and
drawing blank vertical lines through characters of said detected text.

7. The system of claim 5, further comprising:
storing a copy of said identified content to a storage device before modifying said content; and
printing on said confirmation page a character sequence which references said copy of said identified content on said storage device.

8. The system of claim 7, further comprising reconstructing said confirmation page by:
receive a digital image of said confirmation page containing said character sequence;
retrieving said character sequence from said digital image of said confirmation page;
referencing said stored content using said retrieved character sequence;
retrieving said identified content from said storage device;
obtaining a new template of a fax confirmation page for said fax document;
combining said retrieved content with said new fax confirmation template; and
providing said new confirmation page to an output device.

9. A non-transitory computer program product for protecting content printed on a fax confirmation sheet which contains an image of a first page of a faxed document, the non-transitory computer program product comprising
a non-transitory computer readable media for storing-instructions that, when executed on a computer, cause the computer to perform:
receiving a digital image of a fax document;
identifying content in a first page of said digital image to be displayed on a fax confirmation page;
modifying, selectively, one or more characters of said identified content, within a given text size with other visible markings, such that said one or more characters with said substituted visible markings is no longer visibly legible by blurring said identified content using a Gaussian blur function with a value of sigma, where sigma is selected based on said given text size for each row of text;
obtaining a template of said fax confirmation page for said fax document;
combining said modified content with said retrieved fax confirmation page template, said combination comprising said fax confirmation page, said modified content being combined with said fax confirmation page template in a manner which preserves a spatial relationship of content as it appears on said first page; and
providing said fax confirmation page to an output device.

10. The computer program product of claim 9, wherein modifying at least a portion of said detected text comprises any of:
- replacing at least some characters of said detected text with other characters and symbols;
- deleting some words of said detected text; and
- drawing blank vertical lines through characters of said detected text.

11. The computer program product of claim 9, further comprising:
- storing a copy of said identified content to a storage device before modifying said content; and
- printing on said confirmation page a character sequence which references said copy of said identified content on said storage device.

12. The computer program product of claim 11, further comprising reconstructing said confirmation page by:
- receive a digital image of said confirmation page containing said character sequence;
- retrieving said character sequence from said digital image of said confirmation page;
- referencing said stored content using said retrieved character sequence;
- retrieving said identified content from said storage device;
- obtaining a new template of a fax confirmation page for said fax document;
- combining said retrieved content with said new fax confirmation template; and
- providing said new confirmation page to an output device.

13. The method of claim 1, further comprising:
- dividing said digital image into rows of text;
- determine a row's text size for each of said rows of text; and
- drawing blank lines through each of said rows of text with a frequency of blanking based on that row's text size.

14. The system of claim 5, further comprising:
- dividing said digital image into rows of text;
- determine a row's text size for each of said rows of text; and
- drawing blank lines through each of said rows of text with a frequency of blanking based on that row's text size.

15. The computer program product of claim 9, further comprising:
- dividing said digital image into rows of text;
- determine a row's text size for each of said rows of text; and
- drawing blank lines through each of said rows of text with a frequency of blanking based on that row's text size.

* * * * *